US011281951B2

(12) United States Patent
Sakahashi et al.

(10) Patent No.: US 11,281,951 B2
(45) Date of Patent: *Mar. 22, 2022

(54) DEVICE AND ITS USE FOR CREATION, OUTPUT AND MANAGEMENT OF 2D BARCODES WITH EMBEDDED IMAGES

(71) Applicant: 4GQR LLC, Austin, TX (US)

(72) Inventors: Koji Sakahashi, Tokyo (JP); Bryan Schaffner, Charleston, SC (US)

(73) Assignee: 4GQR, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/067,758

(22) Filed: Oct. 11, 2020

(65) Prior Publication Data

US 2021/0027127 A1    Jan. 28, 2021

Related U.S. Application Data

(63) Continuation of application No. 15/058,106, filed on Mar. 1, 2016, now Pat. No. 10,839,275, which is a (Continued)

(30) Foreign Application Priority Data

Jul. 25, 2011   (JP) .................................. 2011-174335
Oct. 4, 2011    (JP) .................................. 2011-232242

(51) Int. Cl.
*G06K 19/06*        (2006.01)
*G06T 11/60*        (2006.01)

(52) U.S. Cl.
CPC .  *G06K 19/06037* (2013.01); *G06K 19/06056* (2013.01); *G06K 19/06103* (2013.01); *G06T 11/60* (2013.01)

(58) Field of Classification Search
CPC .......... G06K 19/06037; G06K 7/1417; G06K 7/1413; G06K 19/06028; G06K 19/06046; G06K 19/06103; G06K 19/06056

See application file for complete search history.

(56) References Cited

U.S. PATENT DOCUMENTS

| 8,783,571 | B2 * | 7/2014 | Sakahashi | ........ G06K 19/06037 |
| | | | | 235/462.01 |
| 10,839,275 | B2 * | 11/2020 | Sakahashi | ........ G06K 19/06103 |
| 2009/0255992 | A1 * | 10/2009 | Shen | ....................... G06T 11/60 |
| | | | | 235/462.1 |

* cited by examiner

*Primary Examiner* — Suezu Ellis

(74) *Attorney, Agent, or Firm* — Payam Moradian

(57) ABSTRACT

Provided is a Device, a System, applications and an associated Ecosystem for the consistent and reliable production, creation, generation, management and utilization of two-dimensional ('2D') barcodes ('Codes') featuring embedded Images, designating the alignment position and alignment size of the embedding Images in 2D Codes and enabling the corresponding outputted Code files by the Device System to be downloaded and or showcased digitally within all forms of digital advertising, media, television, mobile telephony and the world wide web as well as integrated with the production processes for consumer products and packaged goods, printed products, merchandise and other items featuring such 2D Codes creating a public telecommunications platform and or private intranet services featuring a searchable database, directory and or registry of the 2D Codes with embedded Images that have been created by, produced by and outputted by the Device or System.

14 Claims, 26 Drawing Sheets

Translator's note:
"Info."= "Information"

Related U.S. Application Data continuation of application No. 14/308,657, filed on Jun. 18, 2014, now abandoned, which is a continuation of application No. 13/557,174, filed on Jul. 24, 2012, now abandoned, which is a continuation-in-part of application No. 13/286,137, filed on Oct. 31, 2011, now Pat. No. 8,783,571.

(60) Provisional application No. 61/578,858, filed on Dec. 21, 2011.

FIG. 2

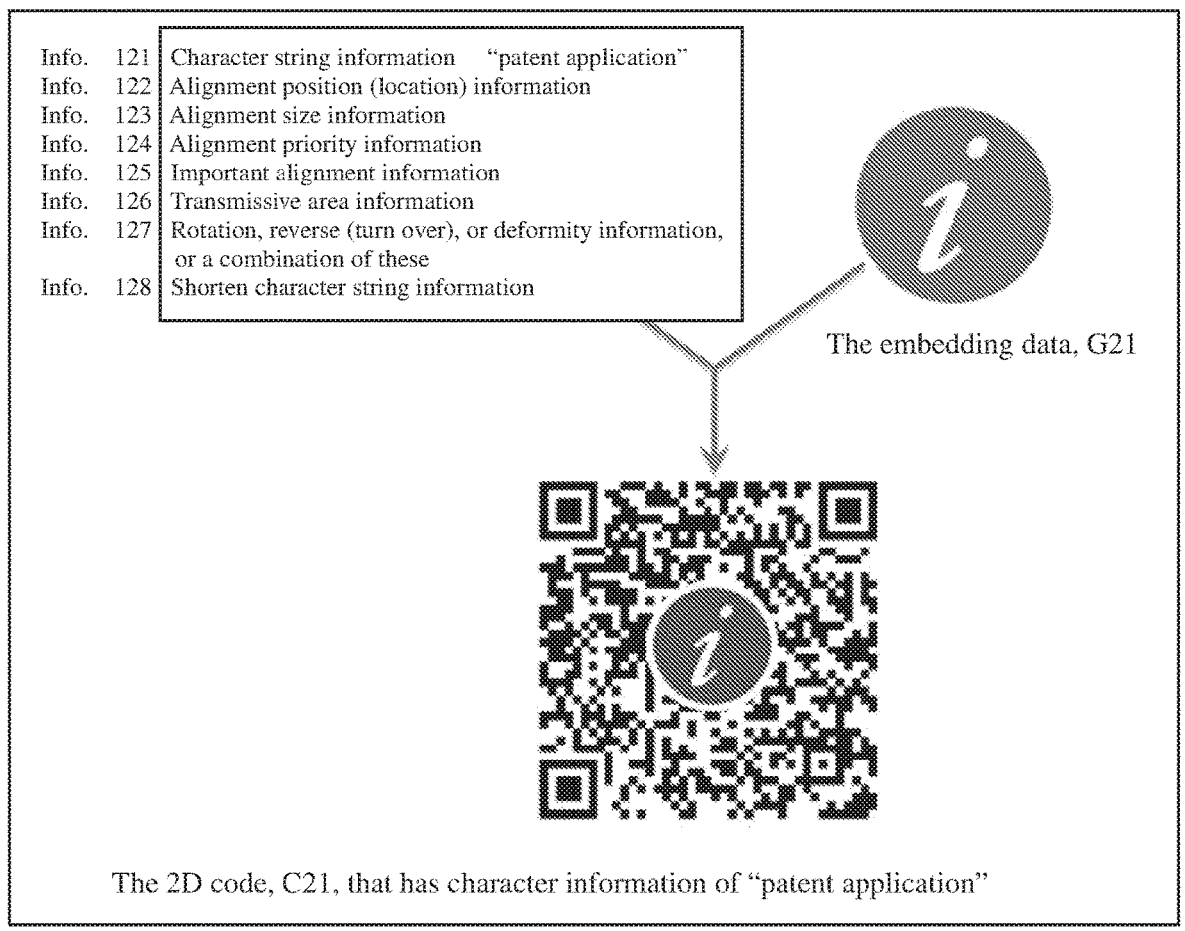

Info. 121 Character string information "patent application"
Info. 122 Alignment position (location) information
Info. 123 Alignment size information
Info. 124 Alignment priority information
Info. 125 Important alignment information
Info. 126 Transmissive area information
Info. 127 Rotation, reverse (turn over), or deformity information, or a combination of these
Info. 128 Shorten character string information The embedding data, G21

The 2D code, C21, that has character information of "patent application"

Translator's note:

"Info."= "Information"

FIG. 6
A 2D code
(it is a QR code in this example)
Embedding data, G21
An example of embedding the embedding data, G21,
into the 2D code by dot-iconization

FIG. 24
Code Creator creation process wherein they are cropping the image that they uploaded to the Device.
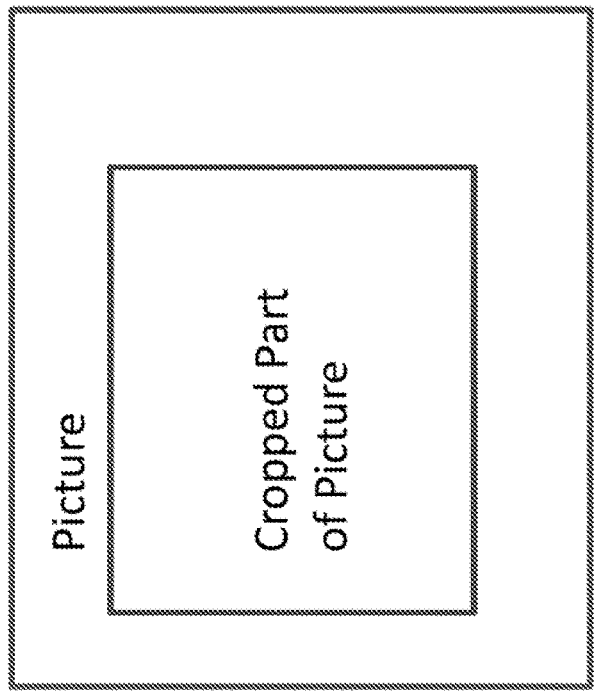
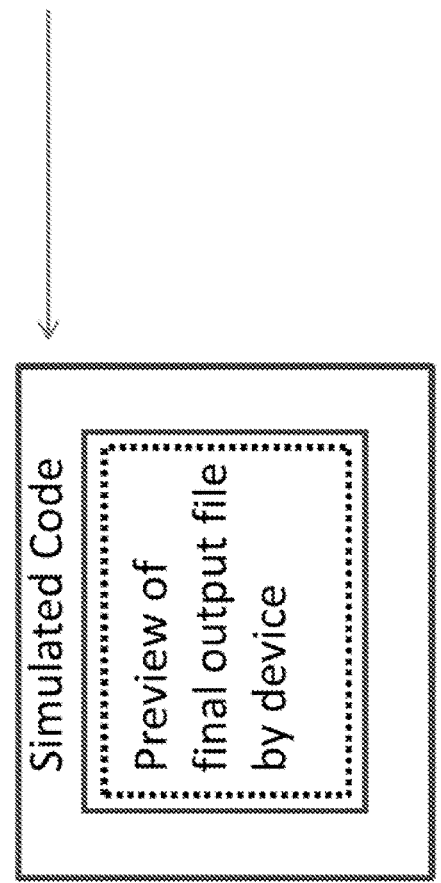
Shown on screen to Code Creator during Code creation process in order to have Code Creator 'approve/finalize' or 'recrop'

FIG. 26

Original URL:
  http://www.example.com/products/books/example-book.php?trackingcode=campaign987

Shortened URL:
  ex 1) http://www.example.com/p123  ⬅........Shorten ex 2) http://ex.jp/shtn4  ⬅...............Shorten

FIG. 27
Type A or B can be selected, according to the number of characters to be encoded.
Type A
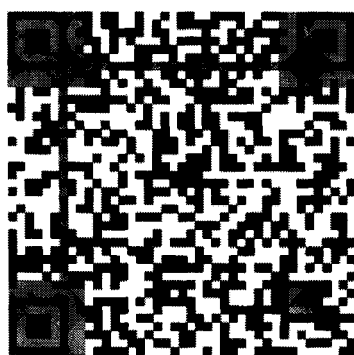
Less than 50 characters
center alignment: possible
Type B
Less than 100 characters
center alignment : impossible
※ An embedding image cannot be laid out on the gray-painted area.

DEVICE AND ITS USE FOR CREATION, OUTPUT AND MANAGEMENT OF 2D BARCODES WITH EMBEDDED IMAGES

CROSS-REFERENCE

This application is a continuation of U.S. application Ser. No. 14/308,657, filed on Jun. 18, 2014, which is a continuation of application Ser. No. 13/557,174, filed on Jul. 24, 2012, which is a continuation in part of U.S. application Ser. No. 13/286,137, filed on Oct. 31, 2011, which claims priority to Japanese Patent Application No. 2011-174,335, filed Jul. 25, 2011. application Ser. No. 13/557,174 also claims priority to Japanese Patent Application No. 2011-232242, filed Oct. 4, 2011 and U.S. provisional application No. 61/578,858, filed Dec. 21, 2011. All these applications are herein by incorporated by reference in their entirety.

FIELD OF TECHNOLOGY

This invention is in the field of telecommunications and computer software regarding a Device which consistently generates, reliably outputs and effectively manages associated functionalities, products and services specific to two-dimensional ('2D') barcodes ('Codes') with embedded Images, on an individual Code as well as aggregate Code basis, for 2D Codes featuring such embedded Images as created by individuals utilizing the invention's systems, software and processes.

BACKGROUND SECTION OF THE INVENTION

There are many types of standardized 2D ('two-dimensional') barcodes ('codes'), referred to herein as '2D Codes' and 'Codes'. The general 2D Codes in use are output according to specifications in a specification document or a standards document (Japanese Publication of Patent Applications No. 2007-34998 and JIS X0510 (Japan Industrial Standards) or ISO/IEC. The 2D Codes appear only as random mosaic patterns, by visual examination. Therefore, without conducting readout processing (decoding of the 2D Codes), it is not possible to infer the encoded information.

The 2D Code by itself has no meaning to the visual eye as traditionally they appear comprised of black and white cell and pixel configurations usually within a square shape. One way to grab attention with a 2D Code is to place an Image on and or within the 2D Code. Consistent placement of an Image on and or within a 2D Code in a uniformed and reliable manner so as to not negatively impact 'readability', however, is not easy. There, is a need in the art to improve the design as well as ensure the readout quality (the success rate of decoding, also 'readability') in the process of embedding a selected Image on or within in a traditional 2D Code.

SUMMARY OF THE INVENTION

In one embodiment, provided is a Device (Or system) for producing a 2D Code with an embedded Image by an automated machine generated process, comprising a processor that adjusts at least one of the following parameters of the Image or graphic data of the Image for embedding in the 2D Code: alignment position, alignment size, rotation condition, reverse (turn over) condition, or the deformation condition. The alignment position can be adjusted. The alignment size can be adjusted. The rotation condition can be adjusted. The reverse (turn over) condition can be adjusted. The Device can comprise a processor for: a) obtaining information to be encoded in a 2D Code and to obtain graphic data to be embedded in the 2D Code, b) generating a 2D Code by encoding the obtained information, c) adjusting at least one of the following parameters of the obtained graphic data: the alignment position, the alignment size, the rotation condition, the reverse (turn over) condition, or the deformation condition, d) tentatively aligning the obtained graphic data in the generated 2D Code, according to the adjusted alignment position, alignment size, rotation condition, reverse (turn over) condition, and deformation condition, e) calculating the error rate of the 2D Code which has the graphic data tentatively aligned, f) repeating steps c, d and e, g) determining the alignment position, the alignment size, the rotation condition, the reverse (turn over) condition, and the deformation condition of the graphic data by referring to the calculated error rate. The device can further comprise shortening information that is encoded as the 2D Code. The Device can further comprise adjusting at least one of the following parameters of the obtained graphic data: the brightness, contrast, or pigment. The device can dot-iconize the graphic data. The device can further change display constituent element incorporated in the contour part of the graphic data from dark color to bright color, or from bright color dark color. The device can further comprise binarizing pixels of bright and dark areas in the graphic data. The device can further comprise calculating an error rate, using tentatively aligned and binarized graphic data in the 2D Code that determines each display constituent, element to be valid or invalid in respect to step (e).

Provided is a Device for producing a 2D Code with an, embedded Image for an automated machine generated process, comprising a processor for obtaining partial information to be encoded in a 2D Code and graphic data to be embedded in the 2D Code, and generating a 2D Code by encoding the partial information after attaching a random or regular character string to the aforementioned obtained partial information. The partial information can be website address.

Provided is a program for Device for an automated machine generated process that produces a 2D Code with an embedded Image, comprising a processor that adjusts at least one of the following parameters of the Image or graphic data of the Image: the alignment position, the alignment size, the rotation condition, the reverse (turn over) condition or the deformation condition. The alignment position can be adjusted. The alignment size can be adjusted. The rotation condition can be adjusted. The reverse (turn over) condition can be adjusted.

Provided is a program comprising:
a) obtaining information to be encoded in a 2D Code and obtaining graphic data to be embedded in the 2D Code, b) generating a 2D Code by encoding the aforementioned obtained information, c) adjusting at least one of the following parameters or the obtained graphic data: the alignment position, the alignment size, the rotation condition, the reverse (turn over) condition, or the deformation condition, d) tentatively aligning the aforementioned obtained graphic data in the generated 2D Code, according to the aforementioned adjusted alignment position, alignment, size, rotation condition, reverse (turn over) condition, and deformation condition, e) calculating the error rate of the 2D Code which has the graphic data tentatively aligned, f) repeating steps c, d and 3e, g) determining the alignment position, the alignment size, the rotation condition, the reverse (turn over) condition, and the deformation condition of the graphic data by referring to the calculated error-rate. The program can comprise shortening information that is encoded as the 2D Code. The program can comprise adjusting at least one: of the following parameters of the aforementioned obtained graphic data the brightness, contrast, or pigment. The program can comprise dot-iconizing the obtained graphic data. The program can comprise changing display constituent element incorporated in the contour part of the graphic data from dark color to bright color, or from bright color to dark color. 8 The program can comprise binarizing pixels of bright and dark areas in the graphic data. The program can comprise calculating an error rate, using tentatively aligned and binarized graphic data in the 2D Code that determines each display constituent element to be valid or invalid in respect to step (e). The program in any of the above embodiments can be on a memory, storage, or other physical medium.

Provided is a Device for producing a 2D Code with an embedded Image by way of an automated machine generated process, comprising a processor for obtaining partial information to be encoded in a 2D Code and graphic data to be embedded in the 2D Code, and generating a 2D Code by encoding the partial information after attaching a random or regular character string to the aforementioned obtained partial information. The partial information can be a website address.

Provided is a Device (method, system, or program) for producing a 2D Code with an embedded Image for an automated machine generated process, comprising; a) storing one or more conditions for embedding an Image in a 2D Code; b) obtaining information to be encoded in a 2D Code and graphic data to be embedded in the 2D Code, c) generating a 2D Code by encoding the aforementioned obtained information while relying on the stored conditions for proper embedding of the Image. The stored conditions can be for an Image from a graphic data that is different than the graphic data to be encoded. The stored conditions can be for an Image from as graphic data that is same as the graphic data to be encoded.

Provided is a Registry and/or Directory comprising a plurality of 2D Codes with an Image embedded on the 2D Codes, wherein a page is linked to each Code, wherein the Registry and/or Directory is searched: or browsed by an individual to find a desirable Code, and the page is accessed by selecting the desirable Code. One or more Codes outputted can be Verified and/or Authenticated. The 2D Code can be a QR Code created: and outputted by a system encompassing the Directory or Registry. The 2D Code can be a QR Code and the Image is that of a logo, brand, picture, individual or correlated to an individual or brand or logo.

Provided is a method (program or system or device) for creating and printing 2D Codes with Images comprising: a) creating, uploading, or importing a 2D Code; b) if necessary adding effects to improve the Code; c) storing the Code; d) performing one or more of the following steps with the Code: i) printing the Code on printed products and other merchandise for a fee; ii) downloading the Code with print-capable quality with high-resolution for a fee; and iii) downloading the Code for free or reduced cost for less than a print-quality, high resolution file.

Provided is a system (program or method or device) for creating and printing 2D Codes with Images comprising: a) creating a 2D Code with an image; b) storing the Code; c) placing the outputted 2D Code by the system on printed products and other merchandise without the Code creator needing to download the Code.

Provided is a method (program or system or device) for integrating information from a 2D Code with an Image into a computing Device comprising: a) clicking, tapping and/or scanning a Code with an Image with an internet-connected computing Device b) automatically or manually integrating information from the Code into one or more applications on the computing Device. The application can be one or more of digital wallet, loyalty program, address book, digital content purchase enabler, calendar, shopping list, or electronic commerce-based shopping cart-integrated.

Provided is a method (program or system or device) for, embedding an Image on a 2D Code comprising: a) designating an area as a safe area for embedding, an Image; b) determining if the Image fits the safe area; c) if the image does not fit the sat area, modify the Image; d) embed the Image on and/or within the safe area.

Provided is a method (program or system or device) for advertising comprising: a) clicking, tapping and/or scanning a 2D Code with an b) a server associated with the 2D Code playing an advertisement; c) directing to final destination specified by the Code, wherein the advertisement is related to one or more of content of the Code or metadata associated with Code creation and/or End-user data.

The representative configuration include a Device comprised of a processor, memory, and interface, a first processing to obtain information to be encoded in the 2D Code and obtain graphic data to be embedded into the same 2D Code, a second processing to encode the previously obtained information to generate the 2D Code, a third processing to adjust at least one of the following: the alignment position, the alignment size, or the alignment condition of the graphic data previously obtained, a fourth processing to follow the adjusted alignment position, alignment size, and alignment condition, tentatively aligning the obtained graphic data based on the previously generated 2D Code, a fifth processing to calculate the error rate of the tentatively aligned 2D Code based on the previously described graphic data, a sixth processing repeating the third to the fifth processing, and a seventh processing to determine the alignment position, alignment size and alignment condition of the aforementioned graphic data by referring to the error rate calculated previously.

Accordingly, provided is a Device (and program) for speedily producing a large number of 2D Codes with embedded Image(s) for an automated machine generated or self-generated process by Code creators, comprising a processor that produces the plural 2D Codes with embedded Image(s) (that may be different Images or even the same Images) at a time.

Also provided are methods of utilizing this Device to produce, manage and provide a range various functions regarding a plurality of 2D Codes with embedded Images (that may be different Images or even the same Images) that are created (also referred to herein as 'outputted') by the Device and corresponding processes and ecosystem, referred to herein as 'Device System' and 'Device System's Ecosystem'.

Additionally, the Systems and processes allow for the interior and/or exterior borders of the 2D Codes to be affixed with graphics-based 'icons' that may or may not be coupled with correlated 'words', per the Code-creator's determination, in order to identify the functionality, content of or associated with the string. Such icons and correlated words may appear on the exterior perimeter of the Code or in some cases in the interior portion.

This 'orientation of the icons and words' may be selected and added by the Code-creators manually and/or added automatically by the Device System and may be programmed to be pre-aligned anywhere surrounding the 2D Code or in some cases within a portion of the interior of a Code. In one embodiment, a bottom right corner orientation can be used.

This additionally functionality makes it more robust than just generating a standalone 2D Code featuring an Image using the automated methods and processes as this addition make more clear to the consumer the type of content associated with the Code, i.e., video, survey, blog, website, discount, music, game, post video, post comment or audio/listen to name just a few content types, prior to scanning the Code.

This addition to the core product, service, method, systems and processes can be applicable for use on printed materials, such as consumer packaged goods, collateral materials including brochures, posters and other signage, fruits and vegetables (as part of farm to fork tracking), traditional billboards and other outdoor media, business cards, stickers and other point of purchase materials, a variety of merchandise including t-shirts, key chains and other products as well as included within paper-based print media and publications including magazines and newspapers, interactive and digital media including being digitally displayed on cinema screens, television screens, digital billboards within television shows and television commercials, electronic magazines, webpages on the world wide web and within mobile operating systems, mobile-computing handsets, devices and tablets and mobile browsers and can appear within web-based or mobile-based rich-media (HTML5) and banner advertisements and other digital advertising formats.

It is possible to improve the design, functionality, aesthetics, attributes, applications and the readout quality (the success rate of decoding) of the embedded 2D Code file outputted by the Device System.

The representative configuration include a device or device comprised of a processor, memory and interface, a first processing to obtain information to be encoded for a 2D Code and obtain graphic data to be embedded into the same 2D Code, a second processing to encode the previously obtained information to generate a 2D Code, a third processing to adjust the alignment location and the alignment size of the graphic data previously obtained, a fourth processing to follow the adjusted alignment location and the alignment size, tentatively aligning based on the previously generated 2D Code, a fifth processing to calculate the error rate of the tentatively aligned 2D Code based on the previously described graphic data, a sixth processing to reduce the aforementioned error rate to be equal to or below the threshold value, repeating the third to the fifth processing, and a seventh processing to determine the aforementioned graphic data's alignment location and alignment size by referring to the error rate previously calculated. It is possible to designate the alignment location and the alignment size to embed colored or black and white graphic data into a 2D Code.

In one embodiment, the present invention provides a device or device for producing a 2D Code with an embedded image for an automated machine generated process, comprising a processor that produces the 2D Code with an embedded image. Producing the 2D Code with an embedded image can comprise: i) obtaining character string information to be encoded for a 2D Code and graphic data to be embedded in the described 2D Code; ii) generating a 2D Code by encoding the obtained information; adjusting the alignment location and the alignment size of the obtained graphic data in the generated 2D Code; and iv) calculating the error rate of the 2D Code which has the graphic data tentatively aligned, and if necessary repeating the third to the fourth steps until the described error rate becomes equal to or lower than the threshold value. Producing the 2D Code with an embedded image can comprise: i) obtaining character string information to be encoded for a 2D Code and graphic data to be embedded in the described 2D Code, ii) generating a 2D Code by encoding the obtained information; iii) adjusting the alignment location and the alignment size of the obtained graphic data in the generated 2D Code, iv) tentatively aligning the obtained graphic data in the generated 2D Code, according to the adjusted alignment location and alignment size, v) calculating the error rate of the 2D Code which has the graphic data tentatively aligned, vi) repeating the third to the fifth steps until the described error rate becomes equal to or lower than the threshold value, vii) determining the alignment location and the alignment size of the graphic data by referring to the calculated error rate. The device can further align the graphic data in the generated 2D Code, based on the determined alignment location and alignment size of the graphic data, and output the 2D Code which has the image aligned. Producing the 2D Code with an embedded image can comprise: i) an interface and memory for receiving character string information and graphic data ii) a processor for encoding the character string information into a 2D Code, generating the alignment location or the graphic data, adjusting the alignment location for the graphic data, regenerating the alignment location for the graphic data to reduce the error rate in the generated 2D Code, and outputting the generated 2D Code with an embedded image according to the alignment location. The step of regenerating the alignment location is repeated until the error rate is equal to or greater than a threshold value. The device can tentatively align binarized graphic data in the aforementioned 2D Code instead of the graphic data in the fourth step (iv), and further binarize the pixels of the bright and dark areas in the obtained graphic data or image. The device can binarize the graphic data using a threshold value. The device can calculate an error rate, using the tentatively aligned and binarized graphic data in the generated 2D Code to determine each pixel to be valid or invalid. The error rate can be calculated based on pixels for 2D Codes.

For a QR Code; the pixels form cells and it is preferred to do an error calculation based on the position for the cells. The "cell" is the minimum structural unit in a QR Code. In other words, it is a smallest component of a QR Code. It is a black or white square that, is the minimum constituent of a QR Code. A standard QR Code consists of certain number of black and white cells.

The step of generating graphic data can comprise binarizing the graphical data using a threshold value. The device can further determine whether the alignment location or the alignment size has priority, and, in the third step, to adjust the alignment location and alignment size of the obtained graphic data in the generated 2D Code, based on the outcome. The device can determine if the obtained graphic data is aligned in comparison to area for decoding of the generated 2D Code, and referring to the error rate calculated in the sixth step, to determine the outcome. The device can further determine whether the generated 2D Code with an embedded image can be decoded prior to output. The device can optionally further carry out transmissive processing before or after the graphic data is tentatively aligned on the 2D Code. The 2D Code can be generated by first reducing the obtained character string information for a pre-existing 2D Code into an encoded form. The reducing can maintain the same information as the pre-existing 2D Code. The device can further comprise a memory for storing a program to be executed by a processor and an interface that facilitates viewing a 2D Code with an embedded image. The image can be selected from the group consisting at least one of a letter or number or combination, multiple letters or initials or numbers or combinations, a word, a keyboard symbol (%, $, @), an icon, an emblem, a shape, a design, a logo, a trademark, a face, an avatar, a picture, a brand, a number, a plurality of numbers, and combinations thereof. The ratio of space covered by the image compared to the code can be about 1/2 to about 1/12, or about 1/9. This ratio depends on the state of technology of cameras and scanners such as those incorporated in mobile phones and other devices that feature cameras and scanning applications that are web-enabled, this can be 'feature' mobile phones or 'smart' mobile phones including 'computer tablets' that feature a built-in camera and that are web-enabled. The '1/9' size ratio (embedded image to surface area of code) is a preferred embedded to surface area ratio, presuming center alignment, at this moment in time given due to achieving the general 'functionality goal' of optimizing the image as large as possible yet maximizing the readability of the code based on the camera-quality (calculated by average number of Megapixels and the correlated 'readability' of such) of the prevailing number of mobile devices in circulation. The code can have about 0 to about 100 characters or about 0 to about 50 characters. The code can be a QR Code. The graphic data can be input in a format selected from the group consisting of jpg, bmp, gif, png, psd, and ai. The image (i.e. graphic data that is output as a 2D Code) in a format selected from the group consisting of eps, pug, ai, gif, bmp, pdf, psd, jpg, and tiff. The character string information to be encoded for a 2D Code or graphic data can be obtained from the Internet or other networks. The graphic data can be uploaded from a computer, mobile phone or any device or cloud (online) storage (such as Flickr) or imported from existing applications (such as from a fixed-Twitter profile picture). The device can take into account the number of characters for the code, size of the image/graphic data and orientation of the image/graphic data to reduce error correction and increase readability of the 2D Code. The character string information can include one or more of the following characters: numeric digits, alphabetic characters, symbols (SP, $, %, *, +, /, :), 8-bit Latin/Kana characters, and Kanji characters.

In another embodiment, the present invention provides a device for producing a 2D Code with an embedded image for an automated machine generated process, comprising a processor that produces the 2D Code with an embedded image by i) obtaining character string information to be encoded for a 2D Code and graphic data to be embedded in the described 2D Code, ii) generating a 2D Code by encoding the obtained information; embedding an image of a predetermined size and optionally alignment at a predetermined location on the 2D Code, wherein the image is of a size and alignment that allows for the code to be decoded properly. The device can generate a plurality of same or different 2D Codes with same or different images, wherein all the images embedded on the 2D Codes have the same size and alignment. The device can generate both a plurality of same codes and plurality of different codes. The device can generate the same image on a plurality of codes that are different. The device can generate the same image on a plurality of same codes. All images can be produced with the same maximum size possible without substantially diminishing the accuracy of decoding the 2D Codes. The ratio of space covered by the image compared to the code can be about 1/3 to about 1/12, or about 1/9. The code can have about 0 to about 100 characters or about 0 to about 50 characters. Tentative alignment and error calculation may not be necessary due to the code and image having predetermined locations. The image can be selected from the group consisting at least one of a letter or number or combination, multiple fetters or initials or numbers or combinations, a word, a keyboard symbol (%, $, @), an icon, an emblem, a shape, a design, a logo, a trademark, a face, an avatar, a picture, a brand, a number, a plurality of numbers, and combinations thereof. The code can be a QR Code. The device can comprise a memory for storing a program to be executed by a processor, an interface (a screen that displays a code with an embedded image for a user to view) that facilitates viewing a 2D Code with an embedded image.

In another embodiment, the present invention provides a program for causing the device as described above to execute a function for producing a 2D Code with an embedded image for an automated machine generated process. The program for executing in a device for producing a 2D Code with an embedded image can comprise: receiving character string information and graphic data, encoding the character string information into a 2D Code, generating the alignment location of the graphic data, adjusting the alignment location of the graphic data, regenerating the alignment location and graphical data to reduce the error rate in the embedded 2D Code, outputting the generated 2D Code with the embedded image according to the generated alignment location.

In another embodiment, the present invention provides a method for producing a 2D Code with an embedded image by an automated machine generated process, comprising embedding an image on the 2D Code while allowing the 2D Code to be decoded. The method can comprise: i) obtaining character string information to be encoded for a 2D Code and graphic data to be embedded in the described 2D Code; ii) generating a 2D Code by encoding the obtained information; iii) adjusting the alignment location and the alignment size of the obtained graphic data in the generated 2D Code; and iv) calculating the error rate of the 2D Code which has the graphic data tentatively aligned, and if necessary repeating, the third to the fourth steps until the described error rate becomes equal to or lower than the threshold value.

In another embodiment, the present invention provides a method wherein the method comprises: i) obtaining character string information to be encoded for a 2D Code and graphic data to be embedded in the described 2D' Code, ii) generating a 2D Code by encoding the obtained information; adjusting the alignment location and the alignment, size of the obtained graphic data in the generated 2D Code, iv) tentatively aligning the obtained graphic data in the generated 2D Code, according to the adjusted alignment location and alignment size, v) calculating the error rate of the 2D Code which has the graphic data tentatively aligned, vi) repeating the third to the fifth steps until the described error rate becomes equal to or lower than the threshold value, vii) determining the alignment location and the alignment size of the graphic data by referring to the calculated error rate. The method can comprise an interface and memory for receiving character string information and graphic data, and a processor for encoding the character string information into a 2D Code, generating the alignment location and the graphic data, adjusting the alignment location of the graphic data, regenerating the alignment location of the graphic data to reduce the error rate in the embedded 2D Code, and outputting the generated 2D Code with an image embedded according to the generated alignment location.

In another embodiment, the present invention provides a method for producing a 2D Code with an embedded image by an automated machine generated process, comprising: i) obtaining character string information to be encoded for a 2D Code and graphic data to be embedded in the described 2D Code; ii) generating a 2D Code by encoding the obtained information; and iii) embedding an image of a predetermined size and optionally alignment at a predetermined location in the 2D Code, wherein the image is of a size that allows for the code to be decoded.

In another embodiment, the present invention provides a device for producing a 2D Code with an embedded image for an automated machine generated process, comprising a processor that produces the 2D Code with an embedded image by: i) obtaining character string information to be encoded for a 2D Code and graphic data to be embedded in the described 2D Code; ii) determining based on the number of characters where graphic data can be placed on the code; and iii) generating a 2D Code with an embedded image. The device can block certain positions for placing an image, allowing an image to be placed elsewhere on the code.

The device/system/program allows for the alignment (left, right, center, up, down relative to the 2D Code) to be adjusted in one embodiment and fixed in another embodiment. It allows the size of the graphic data to be adjusted (smaller and bigger) utilizing a "fenced area" or "blocked area" to determine the maximum size in one embodiment. In another embodiment, the size of the graphic data is fixed and not adjustable by the user. It allows the size of the graphic data to be fixed yet alignment to not be fixed and vice versa meaning the alignment can be fixed and graphic data size to be adjustable. These different options are provided in terms of automated, machine-driven 2D Code creation (both alignment of graphic data and size of graphic data on the code are malleable, both are fixed, or alignment is fixed size is not, or size is fixed and alignment is not). Regarding both alignment and size being "fixed" (graphic data can be uploaded by a user or imported from a third party site that makes available its Application Protocol Interface), the specific alignment of the graphic data on the 2D Code and correlated maximum size of the graphic data can be determined through error-checking or even mathematically and both methods of determining the precise fixed size and alignment can also take into account external factors such as prevailing quality of mobile phone cameras that will be scanning the 2D Codes.

Any of the above programs and methods can be on a computer-readable medium having computer-executable instructions for performing a method that comprises one or more steps, or on a computer-readable medium having stored thereon a data structure, comprising one or more data, or a computer-readable medium having computer-executable instructions for performing a method comprising one or more steps.

BRIEF DESCRIPTION OF THE FIGURES

FIG. 2 illustrates embedding an image in a 2D Code.
FIG. 6 illustrates embedding data with dot iconization.
FIG. 24 illustrates a preview in the form of a simulated Code of the expected outputted 2D Code with an embedded Image by the Device System based on the cropping tools utilized by the Code-creator.
FIG. 26 illustrates shortening of character string information.
FIG. 27 illustrates the locations on the 2D Code that an image can be placed depending on the number of character string information.

DETAILED DESCRIPTION OF THE INVENTION

Provided is an automated process for embedding an Image in a 2D Code. The Image is embedded so a single file with the Image and the 2D core are obtained. The Image can be put on the Code in a fashion that covers over existing Code pixels or alters pixel arrangement or is even placed on a blank space within the Code. There can be a designated 'safe area' within the interior of the Code so that the Code still is able to be decoded reliably, typically the 'safe area' will emanate from the center of the Code for aesthetic purposes but can be situated by the System to even be located partial within the Code and partially outside the Code.

'Code-creator' refers to an individual utilizing the Device System to output, meaning create and store, a 2D Code with an embedded Image.

'End-user' refers to whoever is scanning the Code with a smartphone, mobile tablet, e-reader or other compatible web-connected Device equipped with a digital camera.

'Output' (or 'Outputted') refers to the creation and storing of a 2D Code with an embedded Image by the Device System and associated software programs, processes and applications.

'Download' (or 'Downloaded') refers to the Code that has been outputted by the Device System and has then been exported from the Device System by the Code-creator and stored independently of the Device System's Ecosystem.

Figure 1:
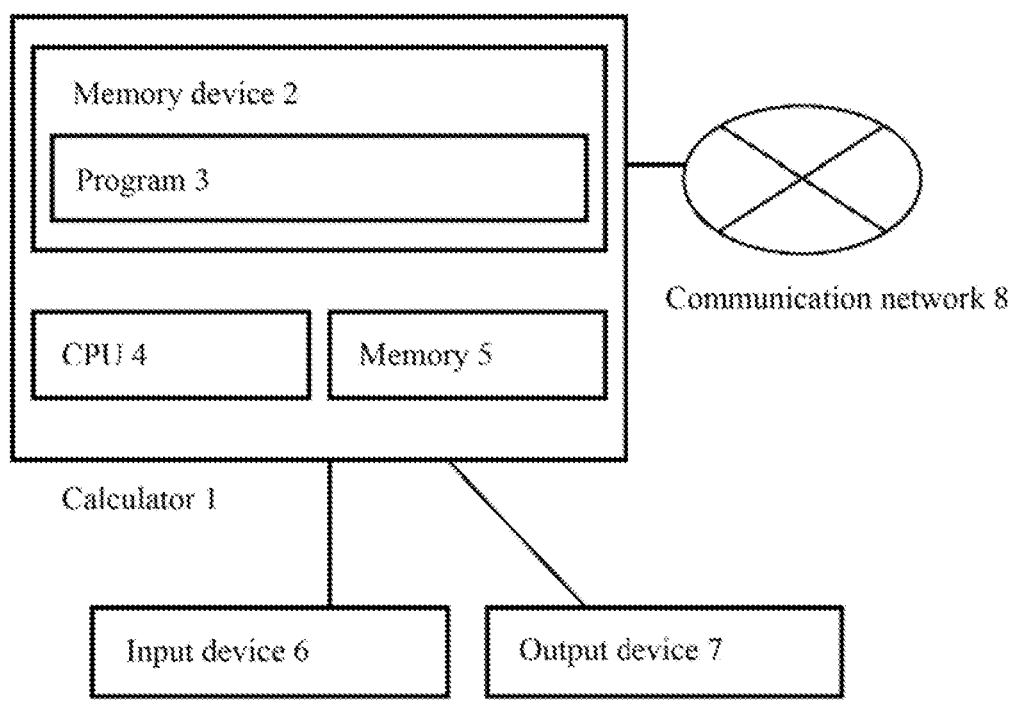
FIG. 1 illustrates the Device System configuration Figure.

FIG. 1 is the Device System configuration. The Device System includes Device 1, Input Device 6, and Output Device 7. It is equipped with CPU 4, Memory 5, and Memory Device 2. Memory Device 2 records various types of information. Memory 5 records programs that execute in CPU 4, and necessary information for CPU 4. CPU 4 executes various types of processings by executing the programs stored in Memory 5. Furthermore, Device 1 is connected to Input Device 6 and Output Device 7. Various types of information are input from Input Device 6. Input Device 6 is, for example, a keyboard or a mouse. Output Device 7 outputs various types of information. Output Device 7 is, for example, a display or a printer. However, Input Device 6 and Output. Device 7 can be part of Device 1. Device 1, can be connected to Communication network 8. Communication network 8 could also be connected to any other, network to which other Devices are connected. For example, Communication network 8 could be the Internet or an Intranet. A system is the software, programs, and associated applications that work with the device.

Memory 5 stores the 2D Code generating program, Program 3. The 2D Code generating program, Program 3, executes various processing steps in the execution configuration, by being executed by CPU 4. Specifically, the 2D Code generating program, Program 3, reads out the data stored in Memory Device 2. Further, the 2D Code generating program, Program 3, receives information which is input from Input Device 6. And the 2D Code generating program, Program 3, outputs data through Output Device 7. Further, the 2D Code generating program, Program 3, sends and receives data to and from other Devices in Communication network 8. Furthermore, the 2D Code can be any Code, if the Code represents information horizontally and vertically. For example, some 2D Codes are as follows: QR Code, PDF417, Maxi Code, or Data Matrix.

FIG. 2 is a concept Figure of the 2D Code output method of the first execution configuration. Device 1 receives character string information, I21, and embedding data, G21. Then, Device 1 encodes the character string information, I21, and generates a 2D Code. Next, Device 1 generates the 2D Code, C21, with embedding graphic data, G21, which is embedded into the 2D Code. Then, Device 1 outputs the generated 2D Code, C21, with graphics. The character string information, I21, is encoded and stored as information in the 2D Code. In other words, the readout Device reads the 2D Code with graphics, C21, and then decodes C21 to obtain the character string information, I21. The embedding data, G21 is graphic data that is intended to be embedded in the 2D Code, and it is graphic data which is to be embedded in the 2D Code. The embedding data, G21, could be colored graphic data or black and white graphic data, regardless of its the configuration, size, or format.

FIG. 2 shows an example of a character string, I21, as the character string "patent application", however, it can be any character string. Furthermore, the embedding data, G21, is a logo graphic data, but it can be any graphic data. The generated 2D Code with graphics, C21, is a QR Code, but it can be any 2D Code. The QR Code is a 2D Code which is specified in JIS X 0510 (Japanese Industrial Standards) or ISO/IEC 18004.

Figure 3:
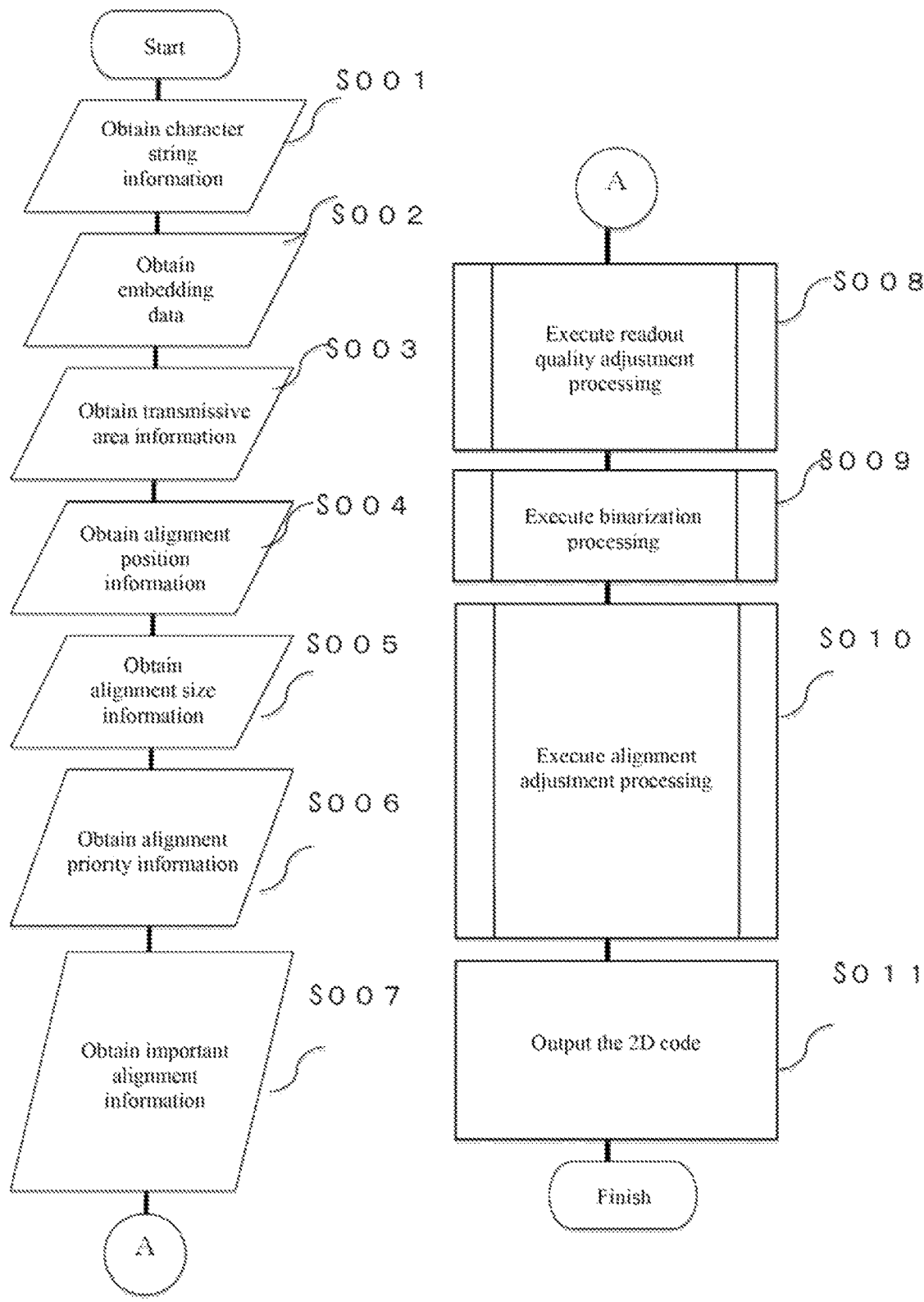
FIG. 3 illustrates a flow chart of the System processing of the Device.

FIG. 3 is a flow chart of the System processing of the Device of the first execution configuration. Device 1 obtains the character string information, I21 (S001). Device 1 can obtain the character string information, I21, by any method. For example. Device 1 obtains the character string information, I21, from Memory Device 2, Memory 5, Input Device 6 or Communication network 8. Then, Device 1 encodes the character string information, I21, and generates a 2D Code. If the character string information, I21, is, for example, a URL, the following processing could be performed. Device 1 determines if the number of the characters is equal to or below a certain limit of the number of the characters, or not. The limit of the number of characters is the upper limit of the number of characters at which the display constituent element (the smallest unit constituting the 2D Code, for example, if the 2D Code is a QR Code, the display constituent element would be the cell), which is incorporate into the 2D Code that will be generated, would not increase further. For example, if the 2D Code is a QR Code, the limit of the number of characters is the upper limit of the number of characters such that the version of the QR Code does not change. In other words, if the number of characters which are incorporated in the character string information, I21, exceeds the limit of the number of characters, the cell size becomes smaller as the number of cells increases due to the increase of the QR Code version number, in the 2D Code that will be generated. Because of that, the readout of the QR Code by a readout. Device becomes more difficult than the less version number. Therefore, if the character string information, I21, exceeds the limit of the number of characters, Device 1 converts the character string information, I21, to a short character string. The method for conversion to a short character string can be any method as long as the number of characters in the short character string is equal to or below the limit of the number of characters. Then, Device 1 encodes the converted character string and produces a 2D Code. For example, Device 1 converts the character string information, I21, to a short character string, utilizing the function equivalent to the publicly-known URL shortening service and HTTP Redirect, and shortens the information to be encoded. Specifically, Device 1 sends the character string information, I21, to a Device for shortening URLs. Once the Device for shortening URLs receives the character string information, I21, it generates a new URL. The number of characters in the new URL that is generated is equal to or below the limit of the number of characters. Next, the Device for shortening URLs records the correspondence between the new URL that was generated and the received character string information, I21. Next, the Device for shortening URLs sends the new URL that was generated to Device 1. Once Device 1 receives the new URL, it encodes the new URL and generates a 2D Code. In this case, the readout Device decodes the 2D Code and accesses the decoded URL. Accordingly, the readout Device accesses the Device for shortening URLs. Then, the Device for shortening URLs searches for the character string information, I21, corresponding to the new URL that is accessed, based on the memorized correspondence. Next, the Device for shortening URLs performs a HTTP redirect processing to the readout Device, with the character string information, I21 (original URL). Accordingly, the readout Device can obtain the character string information, I21 (original URL). On the other hand, if the number of characters is equal to or below the limit of the number or characters (of the character string information, I21), Device 1 encodes the character string information, I21, as is, and generates a 2D Code. However, Device 1 is able to convert the character string information, I21, by choice, regardless of whether the number of the characters is below the limit of the number of the characters, or not.

Next, Device 1 obtains the embedding data, G21 (S002). However, Device 1 can obtain the embedding data, G21, by any method. For example, Device 1 obtains the embedding data, G21, from Memory Device 2, Memory 5, Input Device 6 or Communication network 8.

Device 1 can obtain the transmissive area information, I26 (S003). The transmissive area information, I26, pertains to an area which can be rendered transmissively (desired transmissive area) within the embedded data, G21. The transmissive area information, I26, can be included in the embedding data, G21, or it can be independent data from the embedding data, G21. For example, the transmissive area information, I26, can be information indicating an area of a specific color that is a desired transmissive area. Then, Device 1 can obtain the transmissive area information, I26, by any method. For example, Device 1 obtains the transmissive area information, I26, from Memory Device 2, Memory 5, Input Device 6 or Communication network 8. However, it is optional to obtain the transmissive area information, I26, and Device 1 is not required to obtain the transmissive area information, I26.

Figure 4:
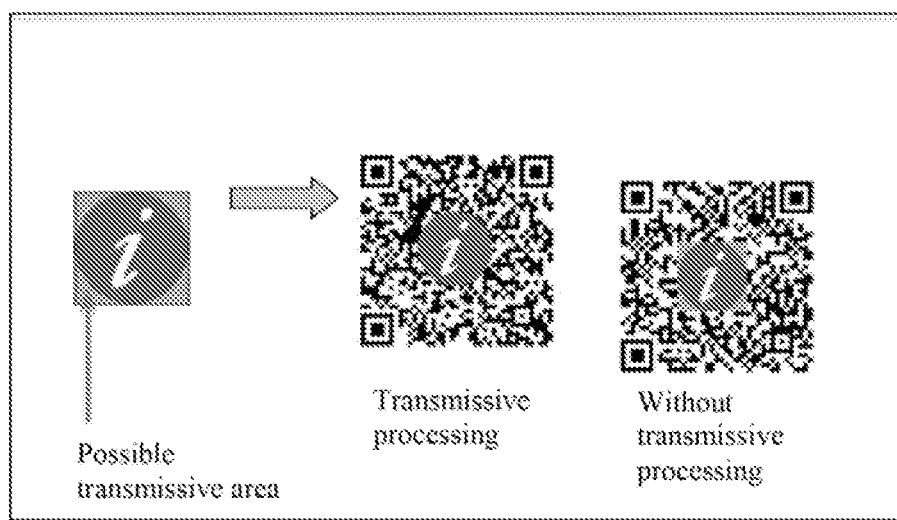
FIG. 4 illustrates an explanatory Figure of the transmissive processing.

After Device 1 obtains the transmissive area information, I26, it goes through a processing sequence during the transmissive processing. FIG. 4 is an explanatory Figure of the transmissive processing of the first execution configuration. Device 1 specifies the desired transmissive area based on the transmissive information obtained, then Device 1 determines if the specified desired transmissive area meets the prescribed conditions. If it meets the prescribed conditions, Device 1 can delete the specified desired transmissive area from the embedding data, G21, in all of the following processing. For example, when all of the specified area are included in the desired transmissive area in the 2D Code, Device 1 deletes the desired transmissive area from the embedding data, G21, in the aforementioned specific area. Therefore, the embedded data, G21, does not get embedded in the aforementioned specific area.

The explanation continues, going back to FIG. 3. Next, Device 1 obtains the alignment position (location) information, I22 (S004). The alignment position information, I22, is a position where the embedded data, G21, is allocated in the 2D Code. In this case, if the alignment position information, I22, indicates where the embedded data, G21, is allocated, the indicating method can be any method. For example, in case of a QR Code, the alignment position information, I22, can be indicated by the number of cells incorporated in the 2D Code, to specify the position. The alignment position information, I22, can be indicated by the number of the pixels incorporated in the embedded data, G21, to specify the position. The alignment position information, I22, can be indicated by the unit of physical length, to specify the position. Device 1 can obtain the alignment position information, I22, by any method. For example, Device 1 obtains the alignment position information, I22, from Memory Device 2, Memory 5, Input Device 6 or Communication network 8. However, it is optional to obtain the alignment position information, I22, and Device 1 is not required to obtain the alignment position information, I22.

Next, Device 1 obtains the alignment size information, I23 (S005). The alignment size information, I23, is a relative size in the embedding data, G21, in the generating 2D Code with graphics, C21. If the alignment size information, I23, indicates how large the embedding data, G21, is, the indicating method can be any method. The alignment size information, I23, can be indicated by the number of display constituent elements incorporated in the 2D Code, to specify the size. The alignment size information, I23, can be indicated by the number of the pixels incorporated in the embedding data, G21, to specify the size. The alignment size information, I23, can be indicated by the unit of physical length, to specify the size. Device 1 can obtain the alignment size information, I23, by any method. For example, Device 1 obtains the alignment size information, I23, from Memory Device 2, Memory 5, input Device 6 or Communication network 8. However, it is optional to obtain the alignment size information, I23, and Device 1 is not required to obtain the alignment size information, I23.

Next, Device 1 obtains the alignment priority information, I24 (S006). The alignment priority information, I24, indicates which has the priority, the alignment position information or the alignment size information. Device 1 can obtain the alignment priority information, I24, by any method. For example, Device 1 obtains the alignment priority information, I24, from Memory Device 2, Memory 5, Input Device 6 or Communication network 8. However, it is optional to obtain the alignment priority information, I24, and Device 1 is not requited to obtain the alignment priority information, I24.

Next, Device 1 obtains the important alignment information, I25 (S007). The important alignment information, I25, indicates if the embedded data, G21, can be aligned or not, in the display constituent element (important display constituent element) which contains important information for decoding the 2D Code. What the important information for decoding the 2D Code means is that it is the information that, if deficient, would have a large impact on decoding. For example, if the 2D Code is a QR Code, the important information in decoding the QR Code includes position detection pattern, margin, timing pattern, separator formatting information and alignment patterns. Furthermore, the important alignment information, I25, can indicate transmissive processing. In this case, Device 1 processes all of the pixels which are aligned on the important cells, with transmissive processing, in the embedding data, G21. Device 1 can obtain the important alignment information, I25, by any method. For example, Device 1 obtains the important: alignment information, I25, from Memory Device 2, Memory 5, Input Device 6 or Communication network 8. However, it is optional to obtain the important alignment information, I25, and Device 1 is not required to obtain the important alignment information, I25.

Next, Device 1 executes adjustment processing (S008). The adjustment processing is a process to improve the degree of readout accuracy of the 2D Code, C21, with graphics, by the readout Device. The details of the adjustment processing are explained in FIG. 5A, FIG. 5B and FIG. 5C.

Figure 5A:
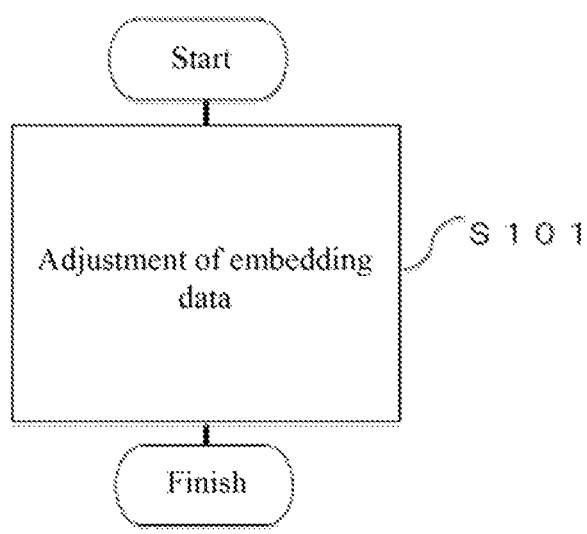
FIGS. 5A-C illustrate a flow chart of the adjustment processing.
Figure 5B:
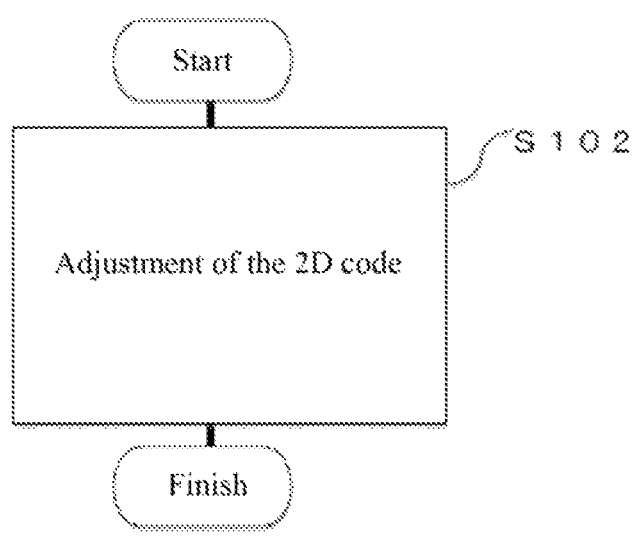
Figure 5C:
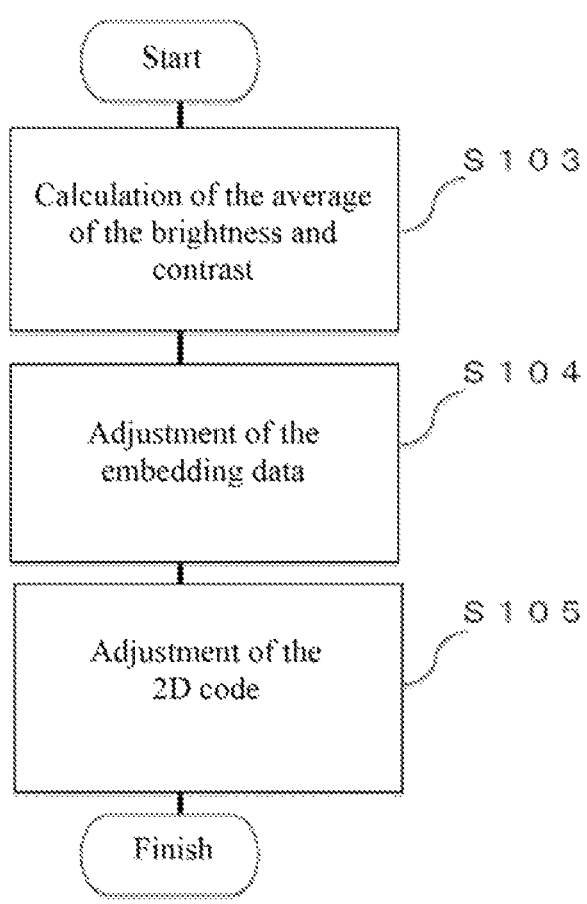

FIGS. 5A, 5B and 5C are flow charts of the adjustment processing of the first execution configuration. FIG. 5A shows a case of adjusting the embedded data only, G21. FIG. 5B shows a case adjusting only the 2D Code. FIG. 5C shows a case of adjusting both the embedding data, G21, and the 2D Code. Device 1 determines the adjustment arbitrarily as an adjustment of only the embedding data, G21, or an adjustment of only the 2D Code, or an adjustment of both the embedding data, G21, and the 2D Code. If it determines to perform the adjustment processing of only the embedding data, G21, Device 1 receives brightness, contrast, and pigment adjustment information. Also, the brightness, contrast, and pigment adjustment information is the information for adjusting at least one of the following parameters: brightness, contrast or pigment. Next, Device 1 adjusts at least one parameter of the obtained embedding G21's brightness, contrast or pigment, referring to at least one of the types of received adjustment information, brightness, contrast or pigment, together with the brightness and contrast of the generated 2D Code (S101). For example, if the 2D Code is a QR Code, Device 1 performs contrast adjustment of the embedding data, G21, in the following manner: first, Device 1 measures the value of brightness of the white color cells and the black color cells that are incorporated in the generated QR Code. In this configuration of the working example, the cells are either white cells or black cells that are incorporated in the QR Code; however they can be bright cells or dark cells (the color of the display constituent element of the 2D Code is sometimes described as other than a white or black color). In this case, in all subsequent processings, white cells become bright colored cells, and black cells become dark colored cells.

Next, Device 1 measures the value of brightness of all pixels in the obtained embedding data, G21. Next, Device 1 selects all pixels that exceed the value of brightness of the white cells, among all pixels in the embedding data, G21. Next, Device 1 approximates the value of brightness of the selected pixels as the value of brightness of the white cells. Next, Device 1 selects all pixels that are below the value, of brightness of the dark cells among all pixels in the embedding data: G21. Next, Device 1 approximates the value of brightness of the selected pixels as the value of brightness of the black cells. Or, Device 1 could give an arbitrary value as the brightness of the pixels incorporated in the obtained embedding data, G21, to include all the values of brightness of pixels in either the range of the value of brightness of the white cells or in the range of the value of brightness of the black cells (so as not to take a degree of brightness which could be perceived as either bright or dark). Device 1 does not need to conduct this kind of process to change the value of brightness of the pixels.

Next, Device 1 calculates an intermediate value between the value of brightness of the white cells and the value of brightness of the black cells. Then, Device 1 increases the level of contrast of the embedding data, G21, using the calculated intermediate value as the threshold value. Specifically, Device 1 selects pixels in the embedding data, G21, from all pixels that have a value of brightness greater than the calculated intermediate value. Next, Device 1 increases the value of brightness or the selected pixels. Then, Device 1 selects pixels in the embedding data, G21, from all pixels that have a value of brightness lesser than the calculated intermediate value. Next, Device 1 decreases the value of brightness of the selected pixels. Accordingly, Device 1 is able to increase the contrast of the embedding data, G21. The 2D Code, C21, which includes the embedding data, G21, with increased contrast, has improved readout quality in the readout Device. Also, Device 1 is able to dot-iconize the embedding data, G21 (please refer to FIG. 6, which is an explanatory Figure of the dot-iconizing configuration in the first working example). Specifically, Device 1 dot-iconizes the embedding data, G21, by processing the graphics of the embedding data, G21, so that the pixels in the embedding data, G21, become the same size as the display constituent element of the 2D Code. At that time, Device 1 dot-iconizes by coloring each of the pixels of the embedding data, G21, with a main color (the pigment that occupies the largest fraction of the area). Further, Device 1 is able to correct the dot-iconized embedding data, G21, depending on input by the Code-creator. Device 1 is able to reduce the error rate for generating the 2D Code, C21, by dot-iconizing the embedding data, G21.

On the other hand, if it is decided to adjust only the 2D Code, it adjusts at least one of the following parameters of the generated 2D Code, brightness, contrast, or pigment, by referring to at least one of the two parameters, brightness or pigment, of the obtained embedding data, G21 (S102). For example, if the 2D Code is a QR Code, Device 1 performs contrast adjustment of the generated QR Code in the following manner. First of all, Device 1 measures the greatest and least values of brightness of the pixels incorporated in the obtained embedding data, G21. Next, Device 1 makes the value of brightness of the white cells of the QR Code equal to or lesser than the highest measured value. Further, Device 1 makes the value of brightness of the black cells of the QR Code equal to or greater than the lowest measured value.

However, if it is determined to perform the adjustment om both the embedding data, G21, and the 2D Code, Device 1 calculates the average brightness, value based om the generated 2D Code and the brightness of the obtained embedding data, G21 (S103). Then, Device 1 adjusts at least one of the following parameters of the obtained embedding data, G21, brightness, contrast, or pigment, using the calculated average value of the brightness and the average value of the contrast as a reference (S104). Next, Device 1 adjusts at least one of the following parameters of the generated 2D Code, brightness, contrast, or pigment, using the calculated average value of the brightness and the average value of the contrast as a reference (S105). Device 1 performs the adjustment processing as described above.

Now, the explanation continues, going back to FIG. 3. Next, Device 1 performs a binarization (black and white degradation) processing of the embedding data, G21 (S109). The details of the binarization processing will be discussed in FIG. 7.

Figure 7:
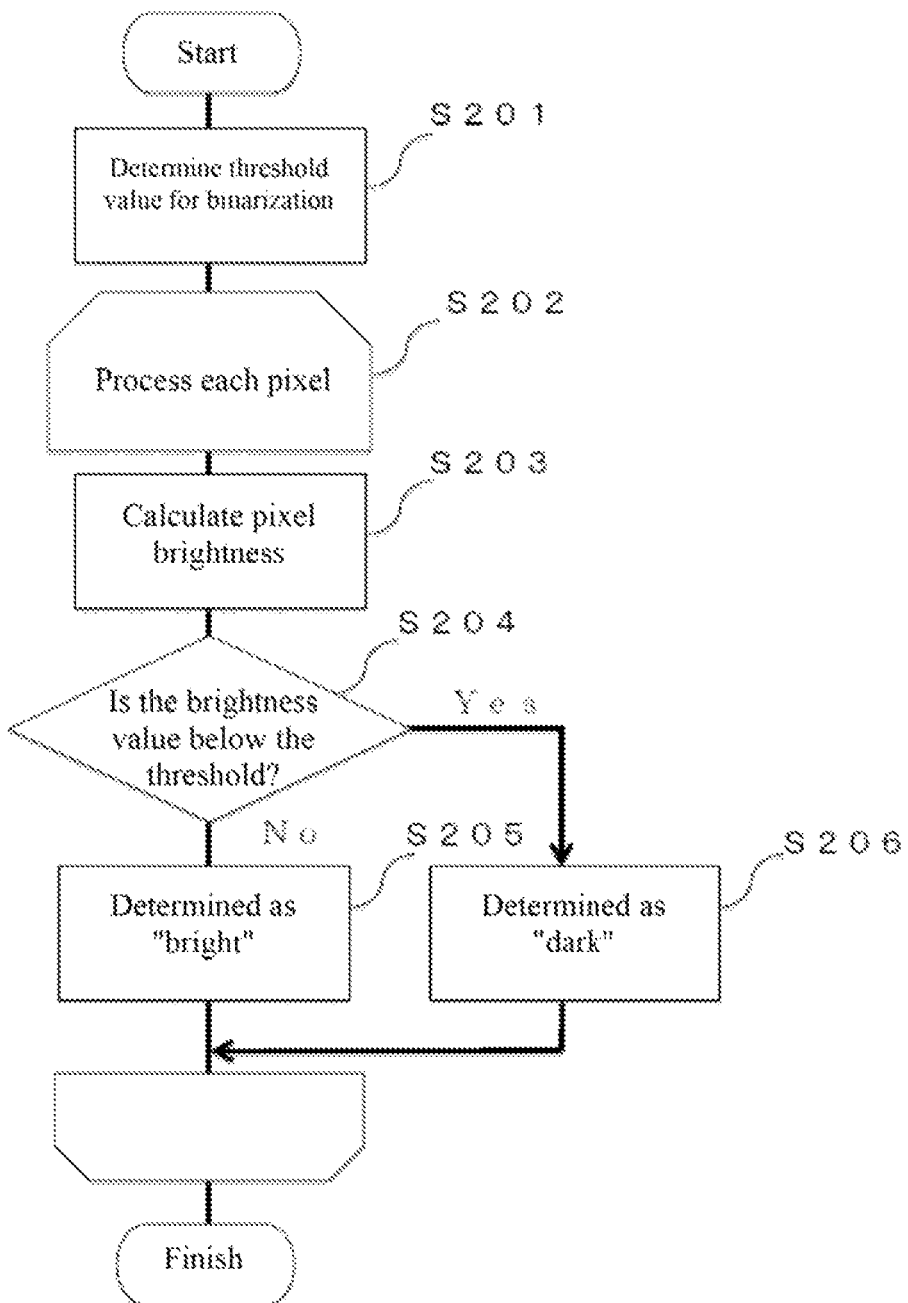
FIG. 7 illustrates a flow chart of the binarization processing.
Figure 8:
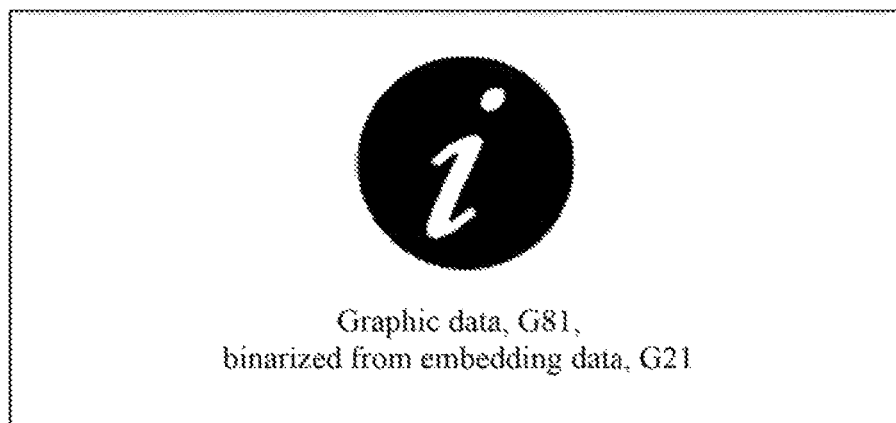
FIG. 8 illustrates an example of the binarized graphic.

FIG. 7 is a flow chart of the binarization processing of the first execution configuration. And FIG. 8 is an explanatory Figure of the binarized graphic of the first execution configuration. Device 1 determines the threshold value to divide the bright and dark areas in the obtained embedding data, G21 (S201). For example, Device 1 calculates the average brightness value of the obtained embedding data, G21, and the calculated average value can be used as a threshold value. Or, Device 1 can calculate in the following way: Device 1 calculates the brightness of the obtained embedding data, G21, in sequence taken from the brightest area at the designated numbers. Then, Device 1 calculates the average brightness value in the bright area. Then, Device 1 calculates the brightness of the obtained embedding data, G21, in sequence taken from the darkest area at the designated numbers. Then, Device 1 calculates the average brightness value in the dark area. Then, Device 1 can determine what the threshold value is, based on the calculation of the average brightness values of the bright and dark areas. In this way, it is possible to eliminate the effects of spiked brightness values on the described threshold value.

Then, Device 1 selects the pixels of the obtained embedding data, G21, in sequence, and the following processing is performed on each of the pixels (S202). Device 1 calculates the brightness value each pixel (S203). Then, Device 1 determines if the calculated brightness value is equal to or below the threshold value (S204). If the brightness value is equal to or below the threshold value, Device 1 determines the selected pixel to be "dark" (S206). On the other hand, if the brightness value is greater than the threshold value, Device 1 determines the selected pixel to be "bright" (S205). Then, Device 1 determines if all of the pixels in the embedding data, G21, were selected in step S202. If not all of the pixels were selected, Device 1 returns to step S202. Device 1 repeats the processing by selecting unselected pixels. On the other hand, if all of the pixels were selected, Device 1 finishes its binarization processing. Then, Device 1 records the determined outcome. Specifically, it records binarized graphic data, G81, based on the graphics containing blight pixels as determined as "bright" and dark pixels as determined as "dark". Device 1 also records the original embedding data, G21, without binarization. Next, Device 1 tentatively aligns the binarized graphic data, G81, on the generated 2D Code. Then, Device 1 uses the tentatively aligned 2D Code for calculating the error rate. Then, Device 1 generates a 2D Code with graphics, C21, by embedding the original embedding data, G21, in the 2D Code, and not by embedding the binarized graphic data, G81, at the ultimate 2D Code output. Furthermore, the calculation of the error rate can be done by Device 1, by tentatively aligning the original embedding data, G21, and not the binarized graphic data, G81.

The explanation continues, going back to FIG. 3. Device 1 repeats the alignment adjustment processing until the error rate of the 2D. Code becomes equal to or below the allowable range (S010). The details of the alignment adjustment processing will be discussed in FIG. 9.

Figure 9:
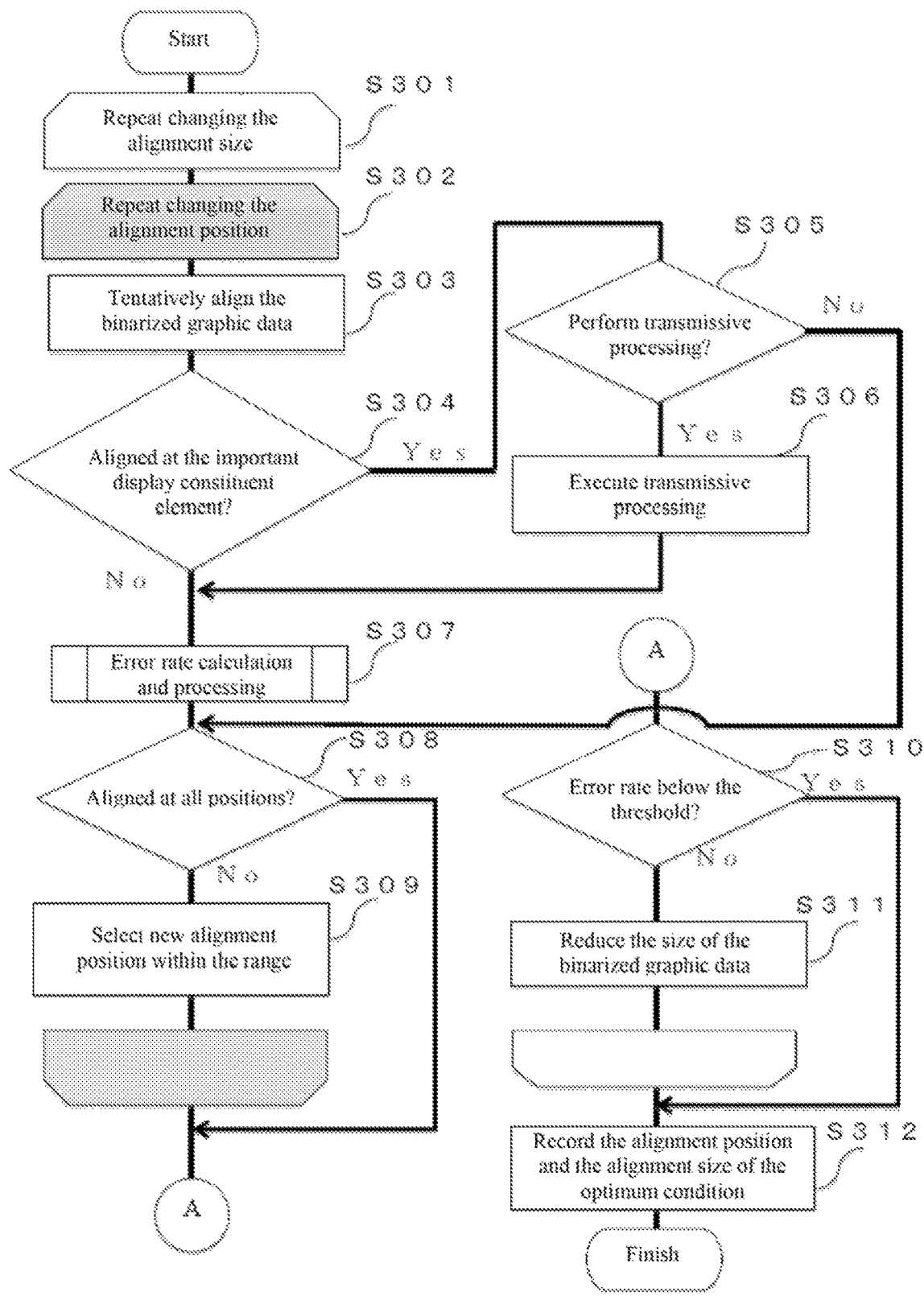
FIG. 9 illustrates a flow chart of the alignment adjustment processing.

FIG. 9 is a flow chart of the alignment adjustment processing of the first execution configuration. Device 1 changes the size of the binarized graphic data, G81, using the obtained alignment size information, I23 (S301). Next, Device 1 tentatively aligns the binarized graphic data, G81, on the generated 2D Code, according to the obtained alignment position information, I22 (S303). Next, Device 1 examines the obtained important alignment information, I25. If the obtained important alignment information, I25, indicates that the embedding data, G21, cannot be aligned at any of the important display constituent elements, then Device 1 determines if the binarized graphic data, G81, is not aligned at any of the important display constituent elements (S304). If there is even one case of the graphic, data, G81, aligned at an important cell, then the embedding, data, G21 cannot be aligned at the alignment position. Therefore, Device 1 determines if the binarized graphic data, G81, has been aligned tentatively at all of the positions within the allowable range (S308). If it has not been aligned tentatively, Device 1 selects a new position where there has not been aligned tentatively (S309). Regarding the allowable range, it can be set beforehand, or it can be included in the alignment position information, I22. Furthermore, if the obtained alignment priority information, I24, indicates that the alignment size information, I23, has priority over the alignment position information, I22, then the allowable range refers to all of the positions in the 2D Code. On the other hand, if the obtained alignment priority information, I24, indicates that the alignment position information, I22, has priority over the alignment size information, I23, then the allowable range will be limited to the positions indicated by the alignment position information, I22, or the periphery only. When Device 1 selects a new position, it goes back to step S302, and aligns the binarized graphic data, G81, at the newly selected position (S303). Then, Device 1 repeats the processing. However, if all the positions are tentatively aligned, Device 1 proceeds to step S310. Meanwhile, if the important alignment information, I25, indicates transmissive processing (S305), Device 1 performs transmissive processing on the pixels aligned at the important cells within the embedding data, G21 (S306). The meaning of transmissive processing is to eliminate pixels from the embedding data, G21. Accordingly, decoding of the generated 2D Code with graphics, C21, becomes possible. Next, Device 1 could perform contour emphasis processing based on the adjustment information of the cells. What contour emphasis processing means is that the cells which are tentatively aligned in the contour pixels of the binarized graphic data, G81, determine if it is black (dark) or not. If the cells are black, Device 1 converts the cells to white (blight). Accordingly, the contour of the embedding data, G21, which is embedded in the 2D Code to be generated, C21, becomes clear. Device 1 could determine if the contour pixels of the binarized graphic data, G81, are aligned in the specific area, and if the cells are black (dark) or not. In a case when the contour pixels of the binarized graphic data, G81, are aligned in the specific area, and also when the cells are black (dark), Device 1 converts the cells to white (bright).

Next, Device 1 performs error rate processing (S310). The details of the error rate calculation processing are provided in FIGS. 10 and 11. On the other hand, if the important alignment information, I25, indicates that the embedding data, G21, can be aligned at the important cells, then Device 1 proceeds to the following step, S307, and performs the error rate calculation processing.

Figure 10:
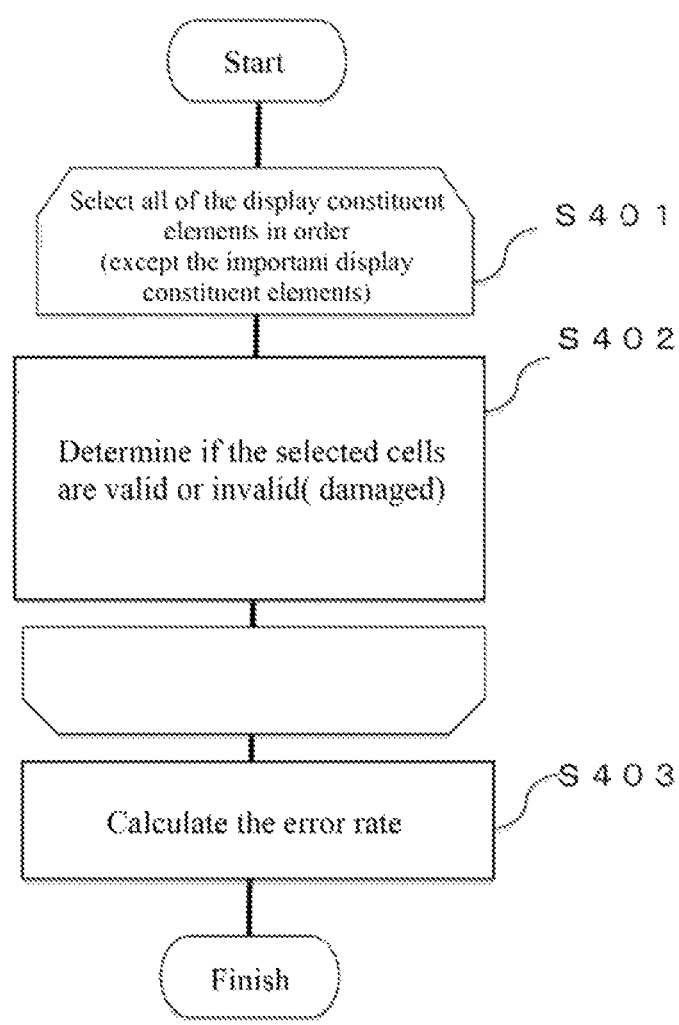
FIG. 10 illustrates a flow chart of the error rate calculation processing.
Figure 11:
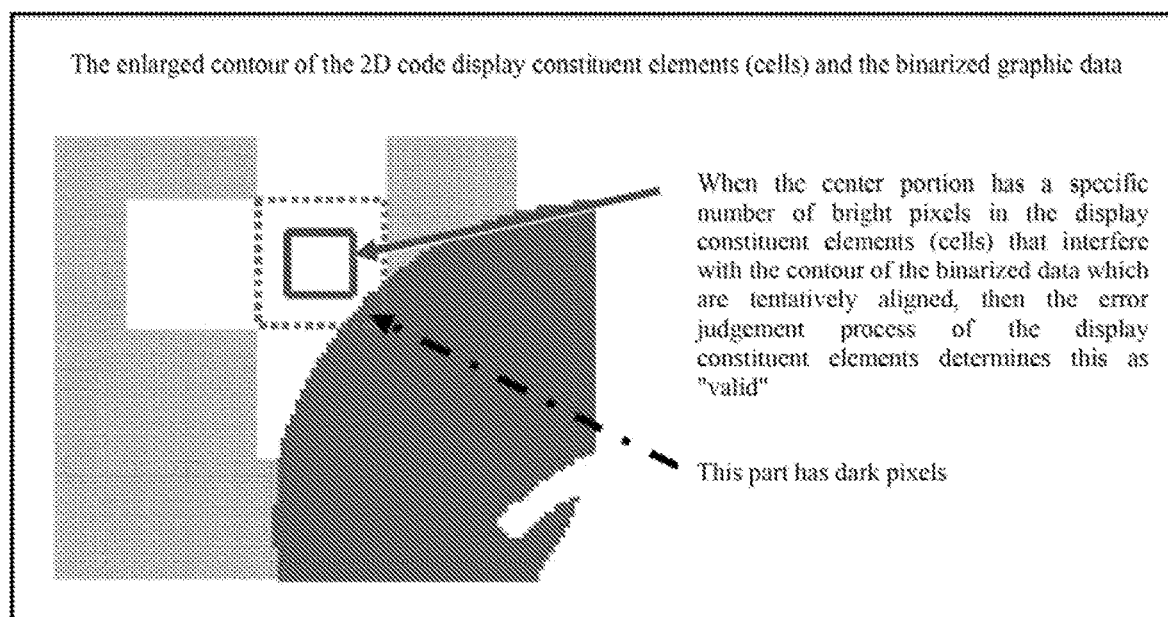
FIG. 11 illustrates error judgment of the contour portion.

FIG. 10 is a flow chart of the error rate calculation processing of the first execution configuration. First of all, Device 1 selects all the cells (except the important cells) incorporated in the generated 2D Code in sequence (S401). Next, Device 1 compares the selected cell with one or more, pixels tentatively aligned at the cell in The binarized graphic data, G81. Based on the comparison, Device 1 determines the selected cell to be either valid or invalid (damaged) (S402). For example, if a white color (bright) cell and all of the bright pixels are selected, then Device 1 determines the selected cell to be valid. Similarly, if a black color (dark) cell and all of the dark pixels are selected, then Device 1 determines the selected cell to be valid. On the other hand, if a white color (bright) cell and all of the dark pixels are selected, then Device 1 determines the selected cell to be invalid. Similarly, when a black color (dark) cell and all of the bright pixels are selected, Device 1 determines the selected cell to be invalid. Furthermore, Device 1 determines a cell to be invalid (damaged) when a portion of the pixels tentatively aligned at the cell are bright, and a portion of the remaining pixels are dark. If the selected cell is white (bright) and it has more than a specific number of bright pixels, then Device 1 can determine that cell to be valid. Similarly, if the selected cell is black (dark), and it has more than a specific number of dark pixels, then Device 1 can determine the selected cell to be valid. And when the selected cell is white (bright), and in the specific central area of the selected cell, the tentatively aligned pixels are all bright, then Device 1 determines that cell to be valid (please refer to FIG. 11). Similarly, when the selected cell is black (dark), and in the specific, central, area of the selected cell, the tentatively aligned pixels are all dark, then Device 1 determines that cell to be valid. If the selected cell has no graphic data tentatively aligned with the binarized graphic data, G81, then Device 1 determines the selected cell to be valid. If the selected cell has tentatively aligned pixels that have transmissive processing, then Device 1 determines the selected cell to be valid. The reason being, that the pixels which are processed transmissively have been eliminated from the embedded data, G21. Furthermore, when the cells have contour emphasis processing to convert them from black (dark) to white (bright), Device 1 determines that cell to be invalid Next, Device 1 determines whether all of the cells have been selected or not, in step S401. When all of the cells have not been selected, Device 1 returns to step S401, and repeats the processing. When all of the cells have been selected, Device 1 calculates the error rate based on the outcome of step S402 (S403). For example, Device 1 calculates the error rate by dividing the number of invalids (including damaged) by the number a cells. The error rate can also be calculated by Device 1, by dividing the number of invalids (including damaged) by the total number of invalids and valids.

The explanation continues, going back to FIG. 9. Next, Device 1 determines if the binarized graphic data, G81, is tentatively aligned at all of the positions within the allowable range (S308). If it is not tentatively aligned at all of the positions, Device 1 selects a new position where it is not tentatively aligned within the allowable range (S309). The allowable range can be set beforehand, or it can be incorporated in the alignment position information, I22. If the obtained alignment priority information, I24, indicates that the alignment size information has priority over the alignment position information, I22, then the allowable range will be all of the positions within the 2D Code. On the other hand, if the obtained alignment priority information, I24, indicates that the alignment size information, I23, has priority over the alignment position information, I22, the allowable range will be limited to the positions indicated by the alignment position information, I22, or the periphery only. When Device 1 selects a new position, it goes back to step S302, and aligns the modified graphic data, G81, in the newly selected position (S303). Then, Device 1 repeats the processing. However, if all of the positions tentatively aligned, Device 1 selects the smallest error rate among all of the calculated error rates. Next, Device 1 compares the selected error rate to the threshold value (S310). Then, Device 1 determines if the error rate is equal to or below the threshold value. If the error rate is greater than the threshold value, Device 1 cannot embed the embedded data, G21, as is. Then Device 1 reduces the size of the binarized graphic data, G81, to the specified size (S311). The specified size could be the size of one pixel, or could be a predetermined size. Then, Device 1 returns to step S301 and repeats the next processing. On the other hand, if the error rate is equal to or below the threshold value, Device 1 records the selected alignment position information and the alignment size information with the smallest error rate (S312). However, Device 1 can also select the optimum alignment position and alignment size, referring to the error rate and the alignment position and alignment size, and can record this in Memory 5, for instance. Then, Device 1 embeds the original embedded data, G21, or the embedding data, G21, with the adjustment process (FIG. 5A. FIG. 5B, or FIG. 3C) being performed, in the 2D Code, according to the selected alignment position and alignment size. Also, if transmissive processing on the binarized graphic data was performed during the tentative alignment, then Device 1 performs transmissive processing on the original embedded data, G21, or the embedding data, G21, with the adjustment process being performed (FIG. 5A, FIG. 5B, or FIG. 5C). Then, Device 1 embeds the original embedding data, G21, that has been transmissively processed in the 2D Code. Accordingly, Device 1 outputs the 2D Code, C21, with graphics (S011). And Device 1 records the 2D Code, C21, with graphics. In the meantime, Device 1 is able to direct Output Device 7 to output the generated 2D Code, C21, or send it to Other Devices via Communication Network 8.

According to the first execution configuration, Device 1 is able to output the 2D Code, C21, with graphics, which satisfies error rate standards, after obtaining the character string information, I21 and the embedding data, G21. The 2D Code, C21, with graphics, is a 2D Code containing character string information that humans can infer without conducting readout process (decoding the 2D Code).

In the first execution configuration, Device 1 outputs the 2D Code, C21, encoding the character string information, I21. On the other hand, in the second execution configuration, Device 1 determines the optimum character string and outputs the 2D Code, C21, encoding the character string. The structure of the Device System of the second execution configuration is identical to that of the first execution configuration (FIG. 1). This identical structure has identical numbers attached; therefore, the explanation is omitted.

Below, the process of the System of the Device in the second execution configuration is explained, referring to FIG. 3. In the second execution configuration, Device 1 obtains the fixed character strings, the number of characters, and the number of trial times of the variable character strings, instead, of the character string information (S001). Then, the fixed character strings are encoded and become a necessary part of the encoding information, in the encoding information of the 2D Code. For example, the fixed character strings are the first part of the Internet URL address information. The variable character strings are the strings attached to the fixed character strings and they can be any character(s), number(s), or symbol(s), or any combination of these. For example, the variable character strings are the last part of the URL. Also the trial times are the times required to change the variable character strings, in order to find the optimum variable character strings. After Device 1 obtains the information, it generates the variable character strings corresponding to the obtained number of characters. Device 1 is also able to generate the variable character strings using any method. For example, Device 1 could generate the variable character strings, randomly, or it could generate regular variable character strings by a character increment or decrement. Next, Device 1 generates new character string information by attaching the variable character strings to the fixed character strings. Next, Device 1 generates new 2D Codes by encoding the newly generated character string information. Next, Device 1 processes the steps in the range S002 to S010 (FIG. 3). Accordingly, Device 1 is able to record the alignment position, alignment size, and the error rate that is the least error rate, in regards to the 2D Code with the encoded character string information which was generated.

Next, Device 1 determines if the number of instances of variable character string generation is smaller than the obtained trial number of instances, in the step, S001. If the number of instances of variable character string generation is smaller than the obtained trial number of instances, Device 1 returns to the step S001. Then, Device 1 generates a new character string and repeats the aforementioned processing. Accordingly, Device 1 is able to record the alignment position and alignment size having the lowest error rate, and record that error rate, in regards to the 2D Code with the encoded character string information which contains the new variable character strings. On the other hand, it the number of generation instances is larger than the number of trial instances. Device 1 determines the alignment position and the alignment size with the least error rate, among the recorded error rates. However, Device 1 is also able to determine the optimum alignment position and alignment size by referring to the recorded error rates; alignment positions, and alignment sizes. Next, Device 1 embeds the original embedding data, G21, or the embedding data, G21, with the adjustment processing (FIG. 5A, 5B or 5C) into the 2D Code, by referring to the determined alignment position and alignment size. If Device 1 performed a transmissive processing on the binarized graphic data, G81, in the tentative alignment, then it performs the transmissive processing on the original embedding data, G21, or on the embedding data, G21 with the adjustment processing (FIG. 5A, 5B or 5C) as well. Then, Device 1 embeds the original embedding data, G21, which has been transmissively processed, into the 2D Code. Accordingly, Device 1 outputs the 2D Code, C21 (S011). Then, Device 1 records the generated 2D Code, C21. In this case, Device 1 is also able to direct the output of the generated 2D Code, C21, to Output Device 7, or send it to other Devices via Communication Network 8.

According to the second execution configuration, because Device 1 is able to specify the optimum variable character string, it is able to further lower the error rate of the 2D Code, C21.

In the third execution configuration, Device 1 receives the rotation information, I27, rotates the embedding data, G21, and aligns it into the 2D Code. The rotation information, I27, indicates the number of rotations and the angle of the rotation of the embedding data, G21 or the 2D Code. The structure of the third execution configuration is identical to that of the first execution configuration (FIG. 1). This identical structure has the identical numbers attached; therefore, the explanation is omitted. Regarding the processing performed by the Device System in the third execution configuration, it is identical to that of the first execution configuration Device System, except for the alignment adjustment processing (step S010 of FIG. 3). For the identical processing, the explanation is omitted.

Figure 12:
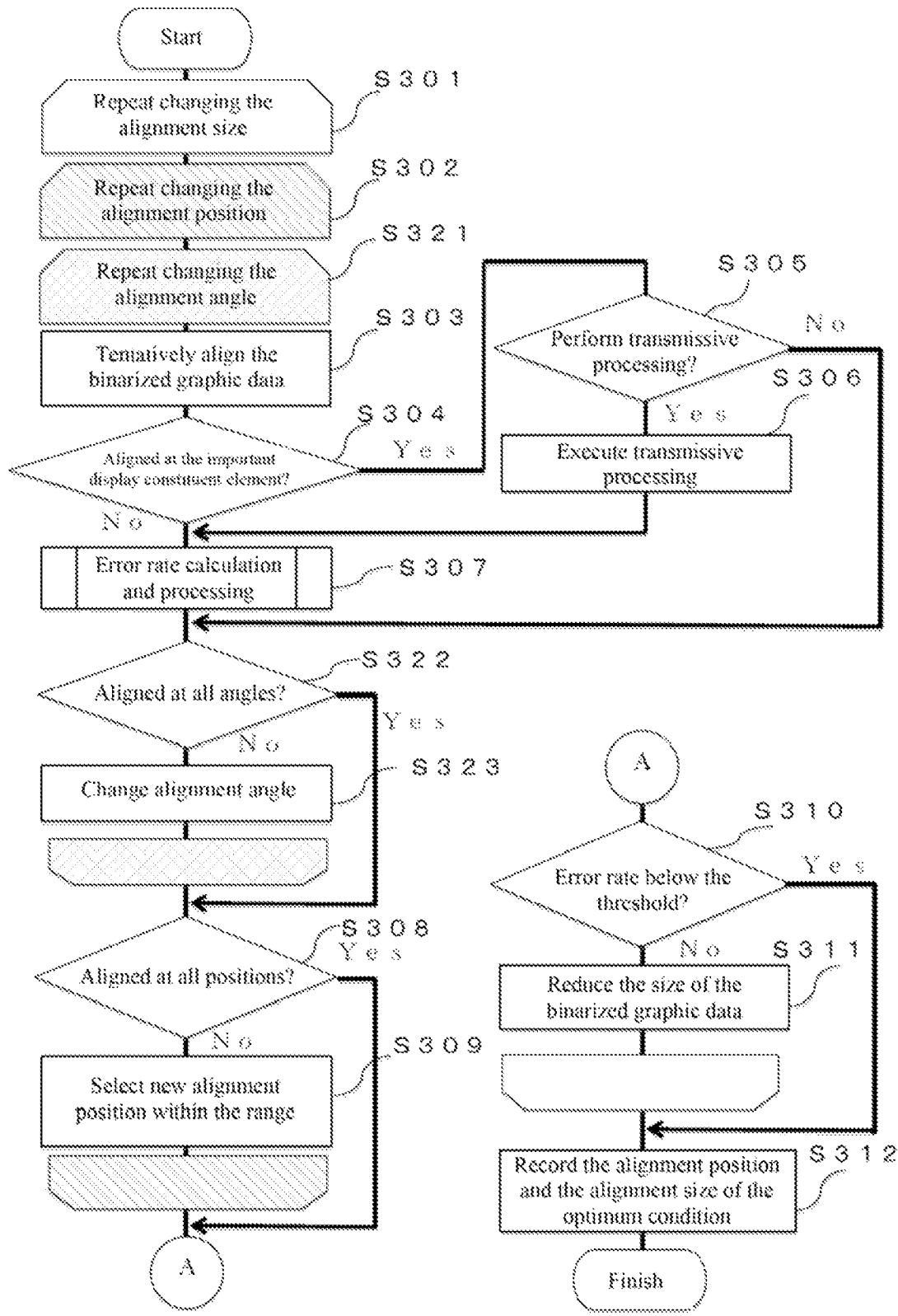
FIG. 12 illustrates a flow chart of the alignment adjustment processing.

FIG. 12 is a flow chart: of the alignment adjustment processing of the third execution configuration. First, Device 1 executes the processing of steps S301.about.S307. Next, Device 1 determines if the binarized, embedded data, G81, has been rotated as, many times as specified (S322). If it has not been rotated as many times as specified, Device 1 rotates the binarized embedded data, G81 (S323). Furthermore, the rotation or the binarized embedded data, G81, or the generated 2D Code can be any method. For example, Device 1 rotates the binarized embedded data, G81, only to the specified angle from the alignment condition determined by the aforementioned step. S323. In addition, Device 1 is able to reverse or deform, without rotating the binarized embedded data, G81, or combine such operations. Deformation is to expand or shrink vertically, horizontally, or the other directions. In this case, Device 1 receives one of the three following types of information: rotation information, reverse (turn over) information, or deformation information, or it receives the information of the combination of these. For example, reverse (turn over) information indicates if the embedding data, G21, will be reversed. Deformation information indicates if the embedding data, G21, will be deformed, and indicates the deformation method. The alignment condition includes information on the rotation angle of the embedding data, G21, or the generated 2D Code and if it is reversed or not, or deformed or not. After Device 1 rotates the binarized embedded data, G81, it returns to step S321 and repeats the same process. Accordingly, Device 1 executes all processing steps, S301.about.S312, of the alignment adjustment process. Further, Device 1 records the selection of not only the alignment position and the alignment size with the least error rate, but also the alignment condition (S312). Device 1 is also able to select the optimum alignment position, the alignment size and the alignment condition by referring to the recorded error rates, alignment positions, alignment sizes and alignment conditions. Next, Device 1 embeds the original embedding data, G21, into the 2D Code by referring to the recorded alignment position, alignment size and alignment condition. If Device 1 performed the transmissive processing in the tentative alignment, then it performs the same transmissive processing on the original embedding data, G21. Then Device 1 embeds the original embedding data, G21, which has been transmissively processed, into the 2D Code. Accordingly, Device 1 outputs the 2D Code, C21 (step S011 of FIG. 3).

According to the third execution configuration, Device 1 is able to further lower the error rate of the 2D Code; C21, by rotation, reverse (turn over) or deformation, or a combination of these:

In the fourth execution configuration, Device 1 generates multiple graphic 2D Codes, C21, containing identical embedding data, G21. The structure of Device System of the fourth execution configuration is identical to the first execution configuration (FIG. 1). This identical structure has the identical numbers attached; therefore, the explanation is omitted. The process of the fourth execution configuration is explained by referring to FIG. 3. In the fourth execution configuration, Device 1 obtains strings of multiple character string information, I21 (S001). Then Device 1 encodes each string of the obtained character string information, I21, and generates 2D Codes. Accordingly, Device 1 generates the same number of 2D Codes as the number of strings of obtained multiple character string information, I21. Next, Device 1 executes the process of S903 to S009. Accordingly, Device 1 adjusts the embedding data, G21, to the optimum level. Next, Device 1 performs alignment adjustment processing on each 2D Code generated by encoding each of the strings of character string information. Accordingly, the alignment position and the alignment size of the embedding data, G21, can be determined for each of these 2D Codes. Then, according to the determined alignment position and alignment size, the embedding data, G21, is embedded into the 2D Code. Accordingly, Device 1 outputs the same number of 2D Codes, C21, as the number of strings or obtained multiple character string information, I21 (S011). Then, Device 1 records the generated 2D Codes, C21, in Memory 5, as an example. Then, Device 1 is able to direct Output Device 7 to output the generated 2D Codes, C21, or send them to other Devices via Communication Network 8. As described above, according to the fourth execution configuration. Device 1 is able to output multiple 2D Codes, C21, which contains the identical embedding data, G21, without repeating the steps S002 to S009, by producing intermediate data which has common processing outcomes.

Figure 14:
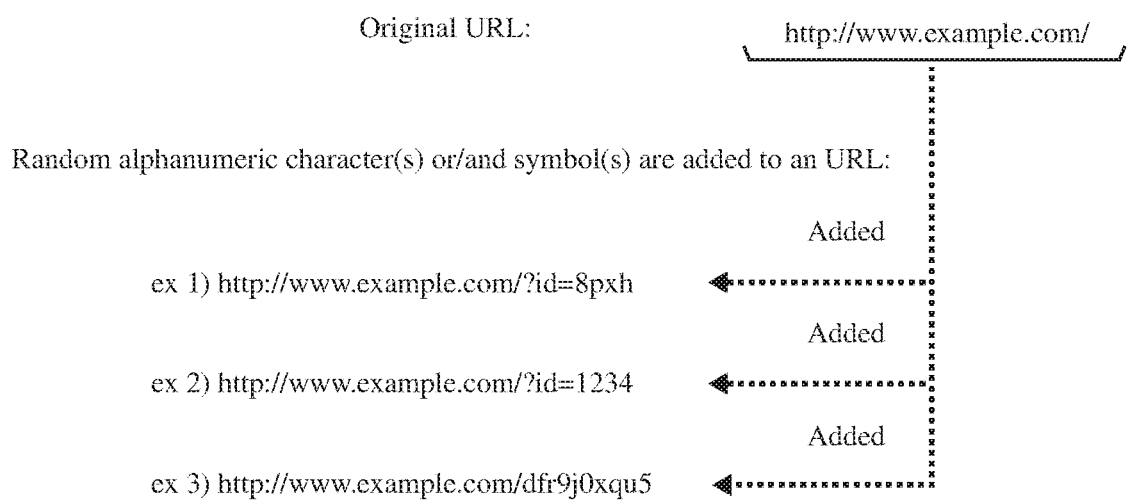
FIG. 14 illustrates a URL-shortener assigning random alphanumeric character(s) or/and symbol(s).

FIG. 14 illustrates a URL-shortener where random alphanumeric character(s) and symbols are added to the URL. In another embodiment, the addition of alphanumeric character (s) and symbols is not random. The use of random URL shortener brings added security and anonymity. The Device System can be used with any URL-shortener or have its own shortener.

Figure 15:
FIG. 15 illustrates a 2D Code with dot-iconized embedded Image.

FIG. 15 illustrates a dot iconized Image, which can help in visual appeal and mass production of Codes with an embedded the linage.

Figure 16:
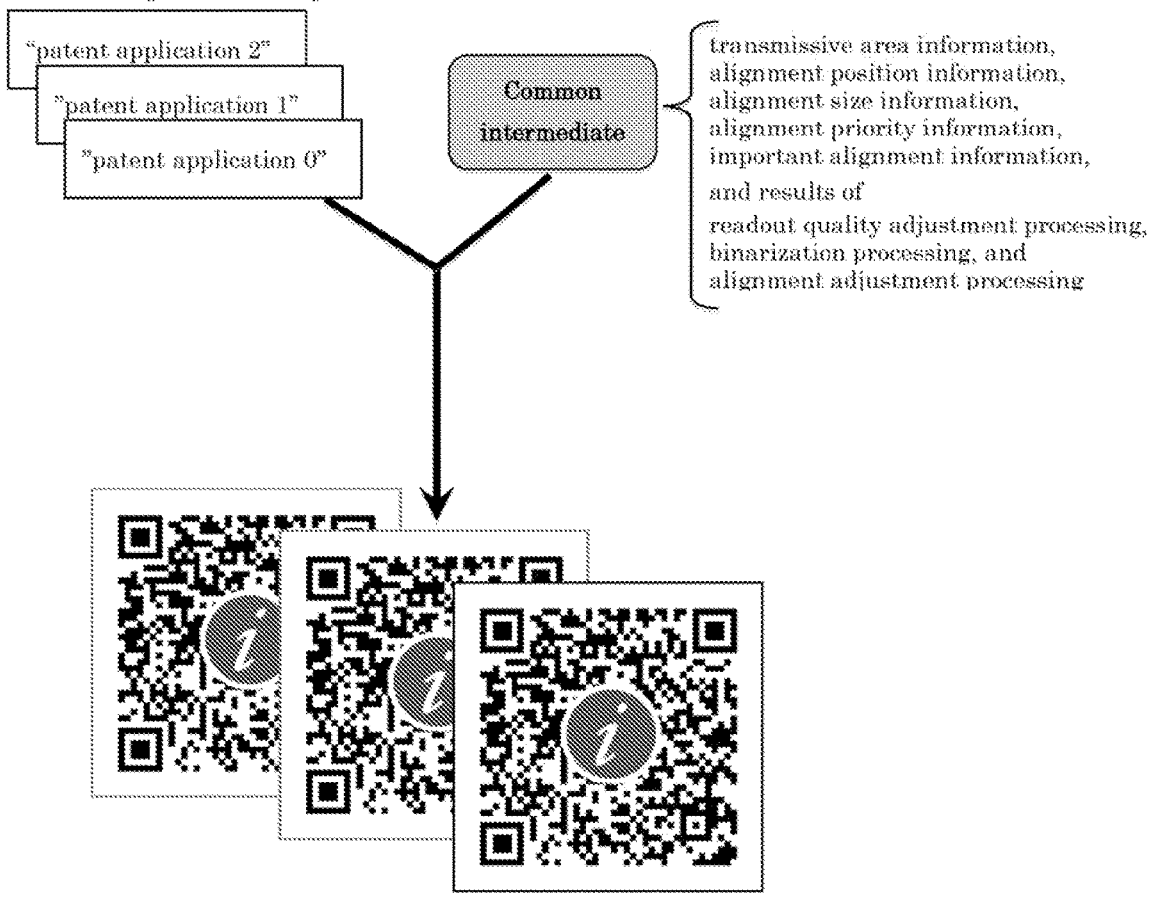
FIG. 16 illustrates a common intermediate used for mass production of Codes by Device System.
Figure 17:
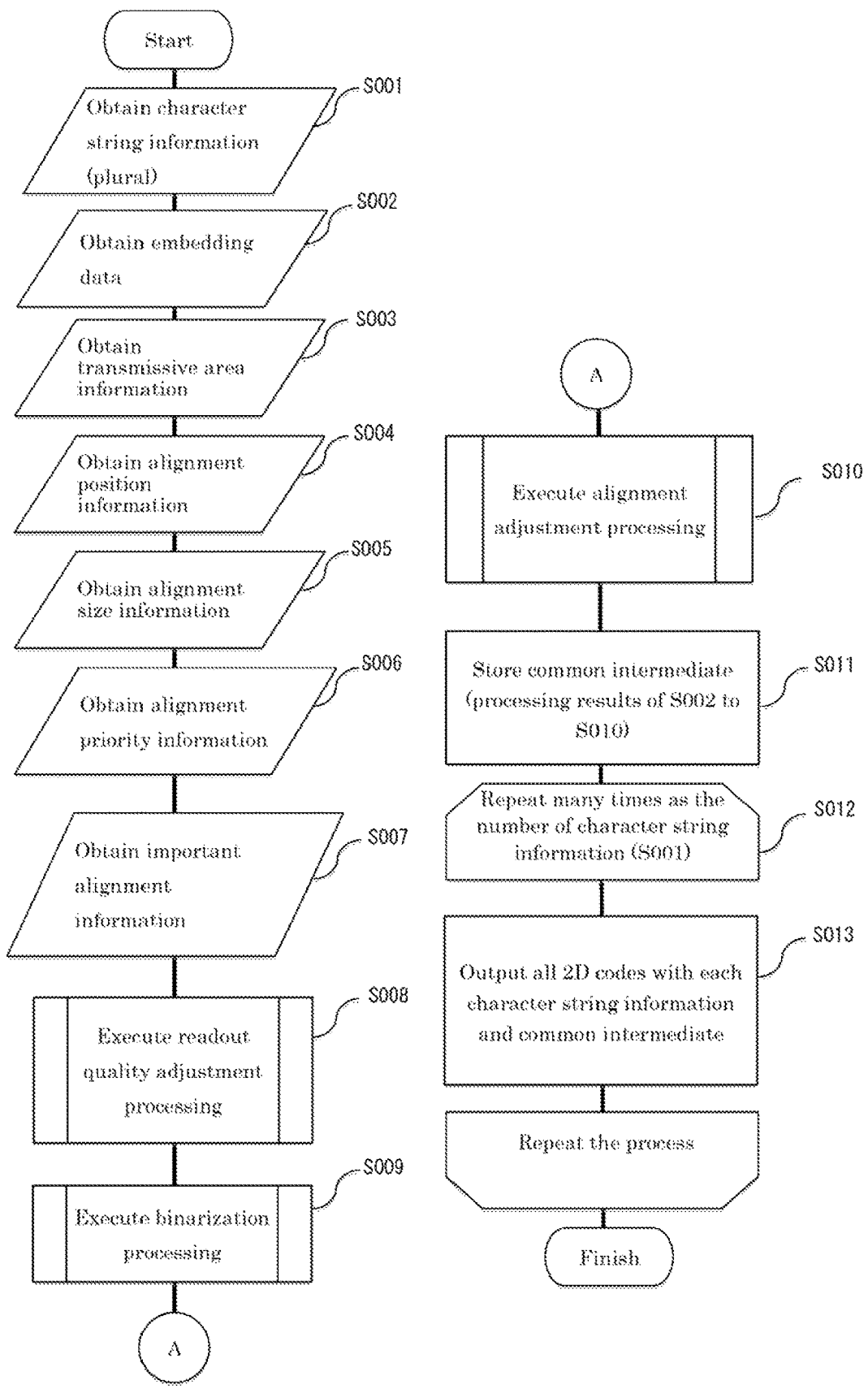
FIG. 17 illustrates a flow chart that includes storing a common intermediate and mass producing Codes by Device System.

FIG. 16 illustrates mass production of different Codes With the same Image. There are three different character string informations, resulting in three different Codes. The same Image is encoded in the different Codes. To expedite mass production, the Device System obtain a common intermediate. That means the Device System obtain an acceptable or optimal condition for placing the Image. The acceptable or optimal condition can be determine by analyzing one or more parameters such as transmissive area information, alignment position information, alignment size information, alignment priority information important alignment information, readout-quality adjustment processing; binarization, processing, and alignment adjustment processing FIG. 17 illustrates a flow chart where character string information (S001), embedding data (S002), transmissive area information (S003), alignment position information S004), alignment size information (S005), alignment priority information (S006), and important alignment information (S007) are obtained. The System can execute readout quality adjustment processing (S008), binarization processing, and alignment adjustment processing. The System then stores a common intermediate (S011). This common intermediate which can be the processing results of S092 to S010 can be repeated as many times as the number of character string information (S012) to output all 2D Codes with each character string information and common intermediate (S013).

Alignment position is the position on the QR Code, where embedding graphic is placed, when it is embedded. Alignment size is the size of embedding graphic on the QR Code, when it is embedded. Rotation condition is the rotation angle of embedding graphic (QR Code), when it is embedded. Reverse (turn over) condition is the inversion such as flip horizontal or vertical.

Once a plurality of Codes have been outputted by the Code-creators, many application exist for the management of individual Codes and groups of Codes as outputted and such is referred to as the Device System's Ecosystem.

Figure 18:
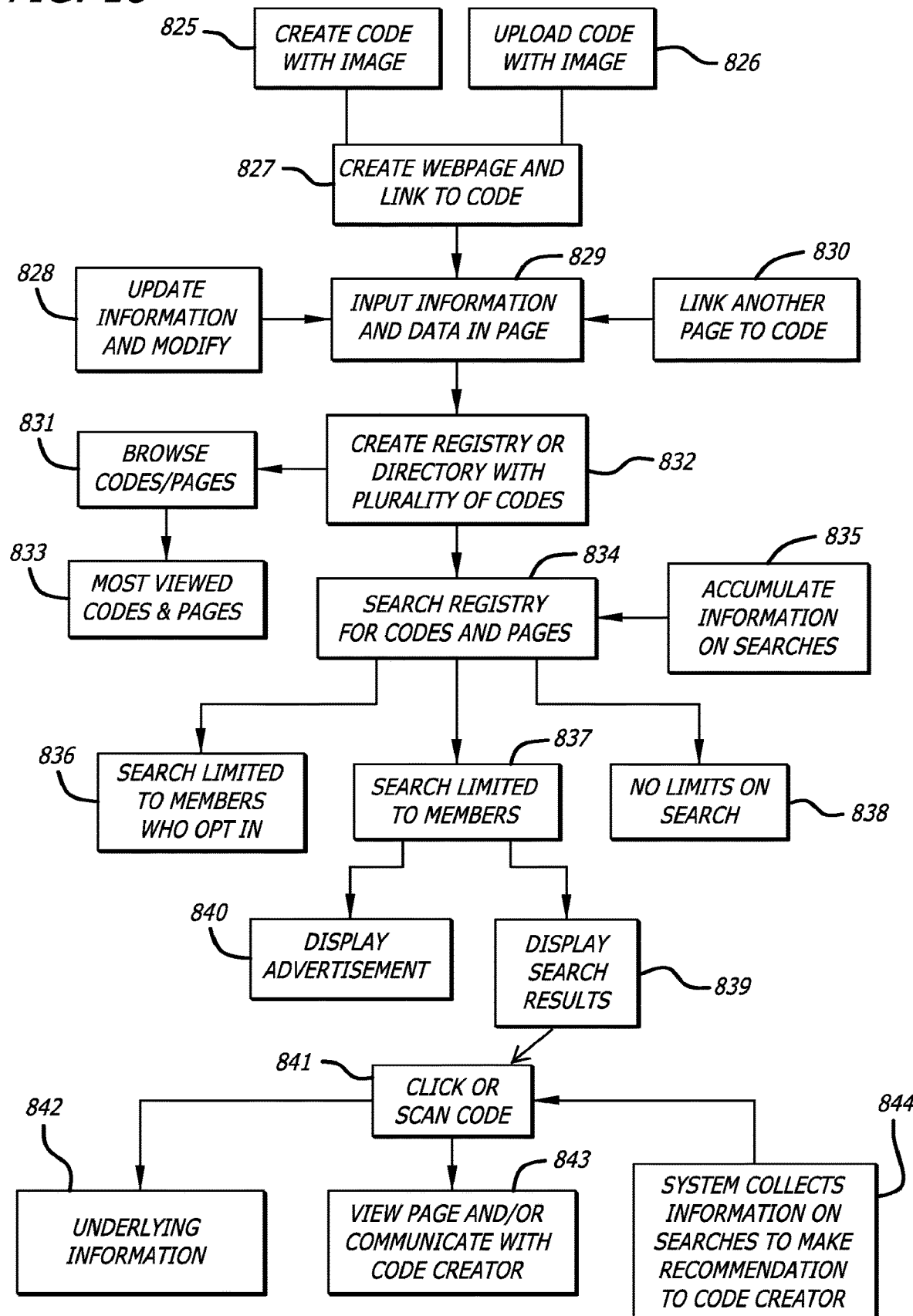
FIG. 18 illustrates a flow chart of creating a Code Directory and Registry of Codes outputted by Device System that is searchable internally and by third parties and End-users.

FIG. 18 illustrates creating a, Directory of 2D Codes that is searchable: A Code with an Image is created and outputted by the Device System (826) or an Image is uploaded to the Device System (826). A webpage ('Page') can be linked to each Code, becoming the Code's 'destination' upon being clicked and/or tapped one or more times in digital format and/or scanned by an 'End-user' in digital and non-digital formats with an internet connected device, said webpage can reside within the Device System's Ecosystem by way of the Code-creator's account management dashboard (827). The Code-creator inputs information, data and any material he or she wishes to appear on said. Page (829) so that when the outputted Code is clicked and/or tapped one or more times and/or scanned by an End-user the information is revealed. The Code-creator can update or modify the information at any time (828) or link the Code to another Page outside the Device System's Ecosystem (830) from the referenced account management dashboard. The plurality or codes created and/or Images uploaded can be used to create a Registry or Directory (832) couple to and/or independent of said internal Pages. The Registry or Directory can be searched (834) or browsed (831) by third party individuals who could be shown specific results or even a list of most viewed or searched Codes (833) in addition to other analytics-based results or data sets. The Device System can accumulate information, historical and in real-time, on searches of Codes or scans/views of Codes (835). The search of the 2D Codes can be limited to registered Code-creators (known as 'Registered Members') who opt-in to be listed in said Directory (836) to all Registered Members if terms of service for the Device System specifies such (837), or have no limits (833) meaning being able to be queried and searched by even non-Code-creators. The search results, some of which may be 'sponsored' or 'paid for' results at the Device System's operator's and/or third party service providers' discretion, are displayed (839) and optionally along with an advertisement (840) which may be correlated to the 'search' information and/or 'content' of the associated Page and/or 'Image' displayed on the Code and/or even geographic-based per the location of the respective End-user. After a 'search', each 2D Code can be 'clicked', 'tapped' as the results are presented in a digital environment and can also be scanned, or otherwise selected. After selection of the 2D Code, the underlying information either the destination entered by Code-creators or even data inputted by a Code-creator such as interests, hobbies, education, location, etc. during the Code creation process or data from a Page a Code-creator may have customized, can be viewed (843). Pages can be updated by Code-creators in order to provide accurate information in real-time to searchers utilizing the Device System's Directory and Registry services. The System can collect information on popularity of searches or other trends to make recommendations to the Code End-user (844). Preferably the Code contains an identifying Image such as a picture, brand, logo or other significant identifier so people and brands can be easily identified within the Registry.

Figure 19:
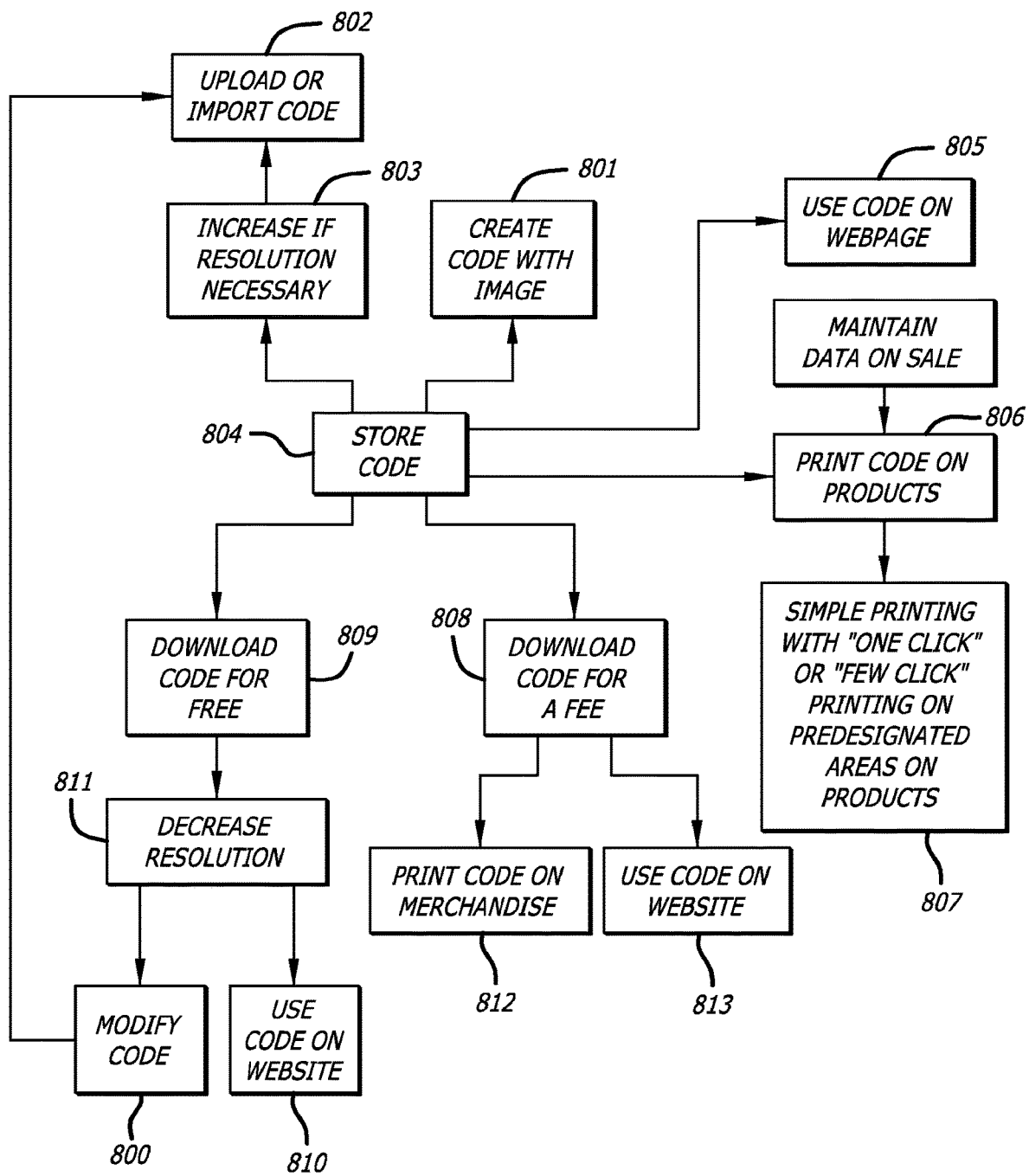
FIG. 19 illustrates a System for storing and using a 2D Code such as for printing on merchandise within Device System's Ecosystem without requiring downloading of Code outputted by End-user.

FIG. 19 illustrates using the Device System to print products and merchandise featuring the Codes outputted without the need for the End-user to download said Code(s). In the event an End-user chooses to download a Code outputted by the Device System this option is available to them as well. An Image can be uploaded or imported (802) or created (801). The resolution of the uploaded or imported image can be decreased (803) if necessary to a lower-resolution Image from a higher-resolution Image automatically by the Device System. Preferably all Codes created have high resolution. The Code can be stored, such as in memory of the Device System (804). To print printed products and produce merchandise hearing the outputted Codes by the Device System, the Code from memory or storage within the Device System's Ecosystem can be placed on printed products and other merchandise with as little as a single 'tap' or 'click' or a few clicks (807) without the need for the End-user to download the Code. The printed products and other merchandise featuring a Code outputted can have pre-designated and specific areas for placement of the Code on such products and merchandise to facilitate the rate of and case of production and ordering of printed products and other merchandise by Code-creators and/or End-users again without requiring a Code-creator and/or End-user to download the outputted Code by the Device System. The System can maintain data on sales and preferences or each Code-creator and End-user and suggest offerings to both. Additionally, if an Code-creator End-user prefers to take the Code outputted by the Device System to a printer of their preference or wishes to place the Code on a webpage, in rich-media advertisements that are HTML5 based, a mobile or desktop banner advertisement or other digital medium (web, television and/or digital billboard for, example), the Device System allows for the Code to be downloaded by the Code-creator from the Device System's account management dashboard. The Code outputted by the Device System can be downloaded by the Code-creator for a fee (808), particularly when the Image uploaded or imported to create such Code(s) are of high resolution. The Code outputted by the Device System can be printed on printed products and merchandise (812) or used digitally on the world wide web, television, interactive media or other digital mediums with a high-resolution Image having been uploaded or imported by the Code creator (813). The System can also provide option of downloading Code for free (809) based on specific resolution parameters including automatically converting a high-resolution Code outputted by the Device System to a low-resolution Code so that said Code is no longer suitable for printing on printed products and/or other merchandise.

Figure 20:
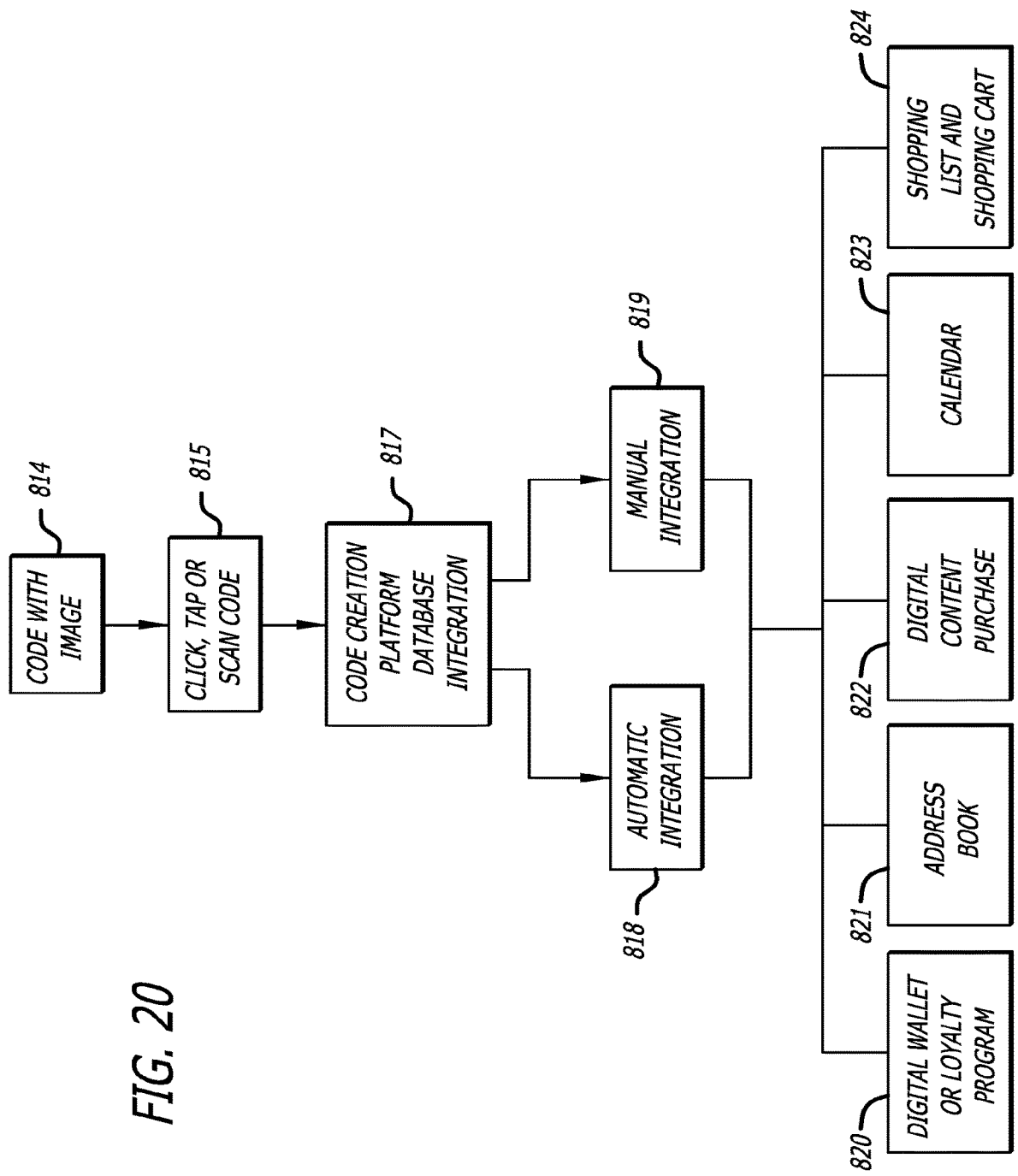
FIG. 20 illustrates integration of information from a Code into a Device used by End-user to scan the Code.

FIG. 20 illustrates the integration of information from clicking, tapping and/or scanning the Code by an End-user, such as a smartphone. A Code with Image (814) is clicked and/or tapped one or more times and/or scanned by end-user. The Code creation platform database interaction (817) can be a software program or application that allows either for automatic integration (818) or manual integration (819) of specific software or an application or other information within an End-user-'s Device. The integration can be that for a digital wallet or loyalty program (820), digital address book (821), immediately downloadable items such as virtual goods and other digital content purchase(s) (822), digital calendar (823), and digital shopping list and electronic commerce-based shopping cart (824).

Figure 21:
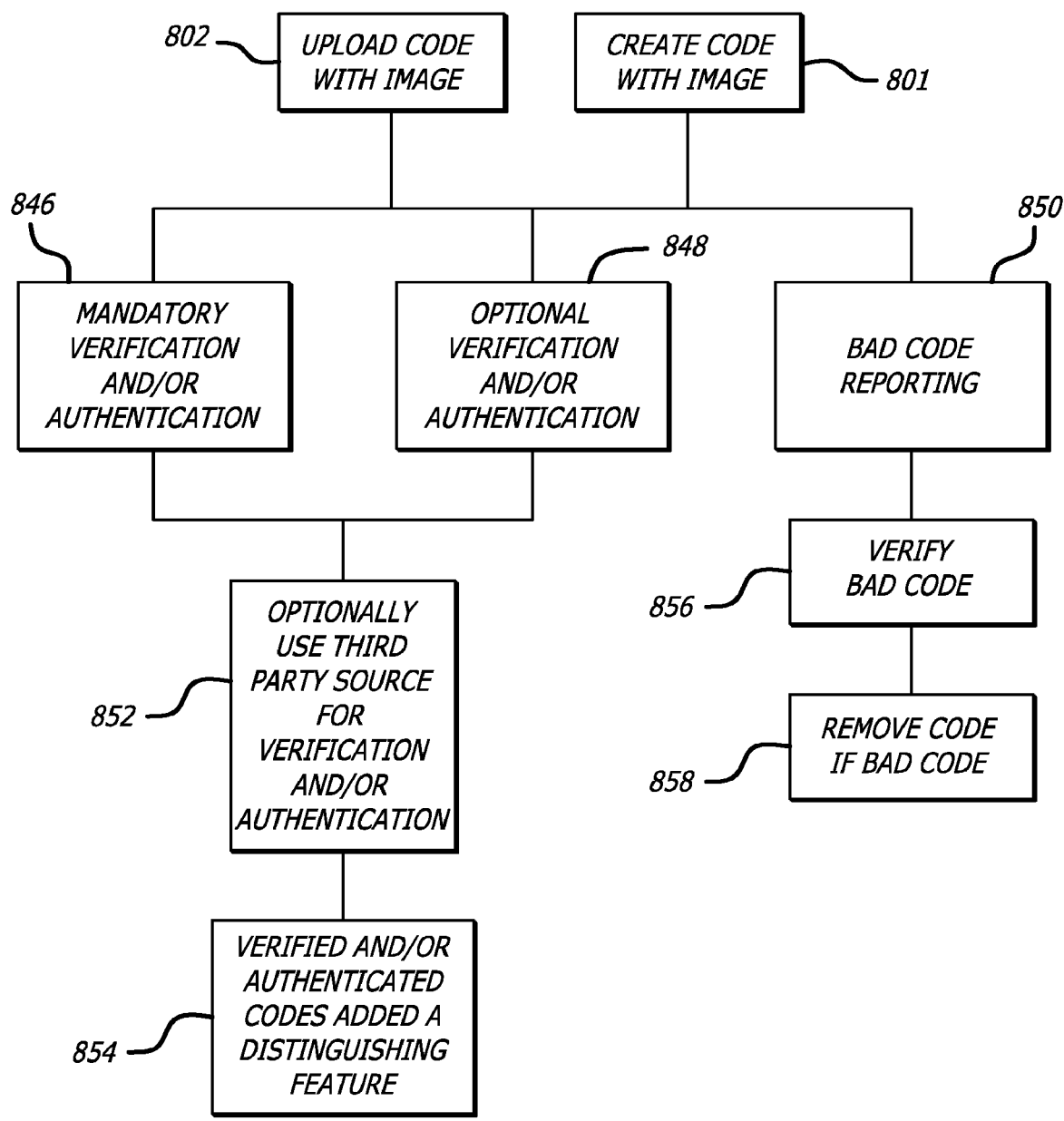
FIG. 21 illustrates Verification and Authentication of Codes outputted by Device System.

FIG. 21 illustrates Verification and/or Authentication of Codes. Verification refers to Verification of information regarding the final destination of the Code. Authentication refers to Authentication of the Code as created by the Code creation System (in-house created Code), also referred to herein as 'Device System'. The System can have mandatory Verification and/or Authentication (825) or optional (826) Verification and/or Authentication signifiers that can be seen and/or heard by End-users. The System can optionally use a third party source and/or sources for Verification (827) and Authentication services. Verified and/or authenticated Codes can have a distinguishing feature or features added to them which may be visual and/or part of the End-user experience (828).

Figure 22:
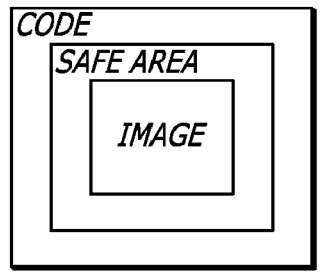
FIG. 22 illustrates an example of a safe area of a Code for the placement of an Image.

FIG. 22 illustrates a. Code with an example of a 'safe area' for placing or embedding an Image within the Code. A Code-creator can have the option of placing the Image in a particular area of the 'safe area' or not be provided such an option, meaning have to have the Image occupy a specific part of or substantially all of the safe area of the Code as determined by the mode of the Device System settings. In one iteration, when an Image is embedded in the 2D Code, the Device does so such that the Image fits the safe area. This automatic fitting of the Image within the safe area is suitable for mass production where plurality of Images are automatically embedded by having them be placed in a pre-designated, specific part of the safe area such that all Codes outputted in this mode have a uniformity.

Figure 23:
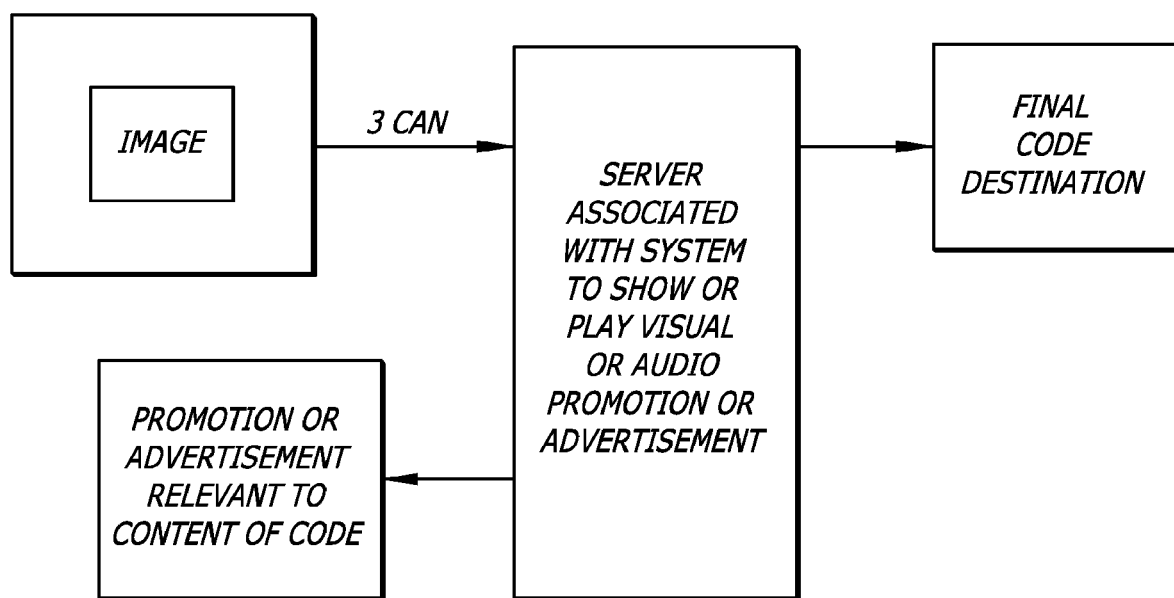
FIG. 23 illustrates an advertisement appearing to End-user in the time between an End-user clicking, tapping and/or scanning a Code and the Code reaching its final Code destination.

FIG. 23 illustrates a Code with an Image that is clicked and/or tapped one or more times and/or scanned by an End-user. After scanning by the End-user, a server associated with the System that created and outputted the Code shows or plays a visual and/or audio promotion and/or advertisement. The commercial/advertisement/promotion can be a static advertisement/still-frame that is present for a certain number of seconds and/or animated (multiple still-frames in sequence) and/or a video—all of which may also feature an audio-based sound file snippet. It is also possible for the Device System to correlate the Image on the outputted Code (or other data culled from the Code-creator in the process of Code creation) to serve specific commercials/advertisements/promotions to End-users. This includes correlating the location of the 'End-user (clicker, tapper and/or scanner of the Code)' to other specific geographic-based commercials/advertisements/promotions i.e., if the System knows an End-user is physically located in Texas or even a specific city, an advertisement may be served to the End-user when a Code outputted by the Device System is clicked and or tapped one or more times and or scanned by the End-user for a Texas-based product or service. The advertisements correlated to the Code data outputted and/or End-user data from scanning the Code's out can also be correlated to the content of the Code and/or the geographic location and/or mobile handset or other connected device of the End-user as determined by End-user's internet protocol address and/or other metrics by the Device System.

The Device System can automatically (or manually at the discretion and option of the Code-creator) convert individual Codes that the Device System has created (801) based on a high resolution Image file that was uploaded or imported into the Device System at 72 dots per inch or greater (or similar graphic resolution metric) (803). At the option of the Code-creator and/or based on preconfigured settings programmed into the Device System, the Device System can convert the resulting Code file that was created by the Code-creator and outputted by the Device-System to a downloadable file format that is 600 dots per inch (or similar graphic resolution metric) or less (809-811) for use of the Codes on primarily digital mediums such as but not limited to the world wide web, internet-connected mobile phone and tablet screen displays as well as other digital billboards, television screens, movie screens and computer devices and all other digital screen formats. Alternatively, an Image that was uploaded or imported to the Device System in a high-resolution format and utilized to create a Code outputted by the Device System may be downloaded by an End-user at the same resolution as the Image the that was uploaded.

The Device System can automatically create a Code with the Image being the exact dots per inch (or similar graphic resolution metric) resolution (versus different resolution than the Image file uploaded or imported) as the Image that the Code-creator uploaded or imported (802-801) into the System by a Code-creator.

The Device System can incorporate an optional initial selection mode for Code-creators which correlates the quality (based on dots per inch or other graphic standard) of the file intended to be upload or imported by a Code-creator's from their web-enabled smartphone or desktop computer or tablet) to specific functionality of the Code, printed products and merchandise options as well as price points for outputted Code downloads by Code creators. This can include options including but not limited to a free or lesser priced download of the Code option for low-resolution Images uploaded and/or imported to the Device System and/or functionality options, such as tools for Code-creators to post Codes to a webpage and/or insert Codes in a rich-media (HTML5) advertisement or mobile or desktop banner advertisement, again without the need for the End-user to download the Code. Images uploaded or imported to the Device System by the Code-creator that are of high resolution may also have correlated output options different than those for low resolution Images which may include but not be limited to offerings of printed products and merchandise:

Code-creators can be prompted by the Device System to predetermine the type and quality of Image file they will be Uploading or importing, in a manual selection fashion or this evaluation of graphic resolution and attributes may be one automatically. This functionality allows Code-creators to also with one click (or more) to simply alternate between a low resolution setting and a high resolution setting during the Code creation process in order to determine the type of file the Device System will output for them during the Code creation process and also after the Code creation process (from high resolution to low resolution).

In one embodiment, a user has the choice of downloading a Code with low or high resolution (808-809). The high resolution Code (808) would be suitable for printing on printed products and other merchandise outside the Device System if the Code-creator so chooses to download the Code outputted by the Device System in a high resolution file format as such can assess the downloader of the Code a fee for downloading such a Code. The Code-creator can also download a low resolution Code even if the Image the Code-creator uploaded was of high resolution through the automatic conversion mechanism (809) at likely a lesser price or even tear free. Another possibility is improving the perceived resolution of an Image that is uploaded or imported to the Device System by utilizing certain graphic effects on such Image, such as dot iconization, that can be automated and or selectable by Code-creators utilizing the Device System (notably these effects such as dot iconization may also be available for high resolution Image uploads or imports). (803). A Code-creator having uploaded or imported a high resolution Image can choose to have the Device System automatically convert the Code outputted by the System to a low resolution Code in order to download the Code for a lesser fee or for free based on the settings of the Device System. The user would pay a fee when downloading the high resolution Code for printing (808)(806).

Images that are imported from the world wide web (versus uploaded) by Code-creator can expedite Code creation by the Device System based on its processes and Image uniformity in terms of such Images all being of the same physical size and not needing to be edited and/or cropped by the Code creator. Such imported Images may, be Images or pictures from a cloud-based service and/or social network profiles accessible by an application protocol interface offered by the respective cloud-based service and/or social network and integrated into the Device System.

'Imported' Images refer to being imported into, the Device System from another location on the world wide web, including but not limited to a cloud-based service or social network, for example, individuals' profile pictures (versus from a Code-creator's computer or smartphone or other hardware Device or web service that stores or uses high resolution Images but that are not accessible by an automated protocol interface). The resolution quality of the file uploaded or imported by the Code-creator can be correlated by the Device System's processes and Systems to provide a specific range of correlated output options manually selected by or automatically configured. Such options may include but not limited to Code functionality and/or destination options for the Code, as well as printed products and other merchandise suggestions for which the resulting outputted Code would be suitable and able to be produced within the Device System Ecosystem without the Code-creator needing to download the Code.

The prompting of the Code-creator to predetermine the resolution quality of Image they are uploading or importing (or having the system perform such Image assessment automatically) based on their expected intended use can trigger an automated process specific to the Device System that drives an internal decision engine that can offer corresponding functionality and output options far Code-creators can be displayed throughout the rest of the Code creation process.

While the System displays only certain options to Code-creators as determined by their file-type and/or file resolution that they upload or import, the Device System can allow the the full range of high resolution file-input and correlated output and functionality as well the full range of low resolution file input and correlated output options. Functionality and in both cases associated download options, printed products and merchandise can be displayed to the Code-creators at the Device System operator's or third party operators' and/or discretion.

The Device System can allow the Code-creators and third party operators of the Device System direct positioning of Codes outputted by the Device System to be placed, with one or more clicks or taps on their internet-connected device (806) (807), on printed products (and other merchandise including but not limited to tee-shirts and key chains) as well as insertion into template rich-media (HTML5) ad formats, mobile or desktop banner ads and digital advertising formats in a pre-determined fixed locations as part of the 'operators and third party service providers" Code-creation platform, operating system and functionality.

Each Code created and successfully outputted by the Device System can also feature a correlated 'Code Page' (a webpage or 'Page") (827) that can be the destination of the outputted Code if the 'Page' is configured by the Code-creator with one or more clicks or taps through their Internet-connected device during or after Code creation process.

As well as providing access to the Code-creator's Codes and Code Pages, the Device System's account management page (also referred to a Code account or Code management dashboard) can also feature an online tracking System for outputted Codes known as the Code management platform. This functionality allows for Code-creators to modify (828) at any time they so choose the functionality and destination of the Codes they have created with the system/device when they are clicked and/or tapped one or more times and/or scanned by End-users.

In addition the Device System's Code management dashboard allows Code-creators and even End-users in certain cases to order printed products and merchandise bearing the outputted Codes with one or more clicks (807) of their internet-connected device based on the parameters specified by the Code-creator or the operator of the Code generation platform.

In addition to the Code management System and dashboard featuring Code-creator's Codes, the Device System can also provide for historical review (806) of ordered items or created products and/or purchasing suggestions, merchandise suggestions or advertisements or advertising content based on each Code the Code-creator has created that resides in the account management dashboard module of the Device System.

Tracking of the shipment of the printed products and/or other merchandise that a Code-creator orders can be achieved through a dedicated webpage within the Code creation platform's Ecosystem in which each. Code that a Code-creator created resides and therefore many of the order details can be pre-populated in the System's order form to further expedite purchasing of printed products and merchandise by Code-creators.

The Code management platform may also feature one-click 'deactivation' of Codes, other Code capabilities and editing of Code destinations and functionality, downloading of the Code, and other functionality options as well as statistical data such as number of scans, geographic area of scans and time of scans tied to each individual Code or a specific user-account which may allow grouping of Code analytics for certain actions allowed by the Device System.

The Device System can have internal Directory and Registry of Codes and/or Code 'Pages' (832) allowing the Codes created and/or digital copies of such to remain resident within the Device System's Ecosystem at the discretion of the Code-creator or operators of the platform as the case may be. This Page can be an internal free standing page (known as Code Page) that is tied to each Code that can be configured as the respective Code's destination at the discretion of the Code-creator (meaning when the outputted Code is clicked and/or tapped one or more times and/or scanned by an End-user the information served to the End-user by the Code outputted by the Device System will be generated by the Device System's internal Systems and the respective Code Page and its associated information that was previously inputted by the Code-creator does not necessarily need to travel to a destination outside the Device System Ecosystem) unless the Code-creator determines otherwise at its sole discretion or the system/device's settings mandate such functionality.

These Code Pages as customized by the Code-creator are part of the Device System's Ecosystem, internal intranet-type structure, other associated internal communication Systems and the corresponding Directory and Registry of all Codes outputted by the Device System.

The referenced searchable Code Directory and/or Registry or Codes and also the searchable corresponding Code Pages, each as independently outputted by the Device System as created by the Code-creators utilizing the Device System can provide, in the aggregate, for a database of the plurality of Codes and/or Code Pages (834). Code-creators can opt-in to be a participant in such Directory and Registry services for Codes and Code Pages they create, meaning their Codes; and/or Pages will be included in such Directory and/or Registry and/or if terms of service specify the automatic inclusion in such. The Directory and/or Registry may be searchable and available only to registered Code-creators and/or non-registered Code-creators based on parameters specified within the Device System and or mode. This 'Directory and/or Registry of the output of the Device System's Codes may be searchable by data provided during and inherent in the Code creation and/or account sign up processes or Code Page configuration and publishing processes for such including but not limited to Name or Description or Nickname of the Code or Code-creator as provided by the Code-creator.

Items like Brand name, Individual name or even themes or other information correlated to data inputted by Code-creators and/or usage patterns and/or frequency of scans and/or other data culled from End-user analytics can also be searchable by independent third parties. Additionally, Brands and Individuals may have to 'opt-in' (836) in order to be 'included' in said 'Directory' and/or Registry and can do so at their sole discretion unless otherwise specified in the Device System's terms or service for one of its particular services and/or offerings. A Brand or Individual Code-creator not 'opting-in' unless the Device System's terms of use specify otherwise will mean their Code and all associated Code creation and any applicable third party data will be specifically excluded from the 'searchable Directory' and public-facing 'Registry' though it wilt still be part of the 'operators and third party service providers'' database just not accessible by any party other than the Device System's operators and selected service providers.

Searchability also may include but is not be limited to data points such as frequency of scans and or number of scans of a particular Code and/or group of Codes created by the Device System (i.e. most popular on a given day, week, month, all time or even within certain geo-fenced areas). Other searchable criteria may include fields specific to certain geographic criteria that may include city, state among other fields even 'themes' correlated to the content of the Images uploaded or imported into the Device System as part of the Code creation and Code Pages processes.

Criteria inputted by 'Code-creators' utilizing the Device System may also include data fields such as interests, hobbies, education and other information provided by Code-creators or even pulled by the Device System's database from third party sources may also be searchable by third party individuals.

Topics Code-creators may have in common with other Code-creators as well as other recommendations, suggestions and connections can be based on algorithms inputted into the System by the third party service providers' and/or operators of the Device System.

The Code creation platform may also make suggestions or recommendations to Registered Members and provide End-user data and usage patterns and location information regarding the Device System's data processing capabilities and relational queries.

Based on specific data or parameters configured by Code-creators the referenced Code Pages can also provide a network connecting individual Code-creator with other Code-creators and or businesses that may have some common denominator, similar interests, hobbies, preferences or educational background or other metrics and analytics culled from Code creation data by the Device System including but not limited to Code Page creation data and associated usage of such by Code-creators and/or End-users.

Other searchable metrics inherent in the Code creation Ecosystem and database can also include but are not limited to Date of Code Creation or date of expected Code Expiration, even Time of Day of Code creation.

Additionally, the Device System may integrate proprietary or third party 'Image recognition' software so that the Brands and Individuals that uploaded and/or imported Images to create their Codes and Code Pages may be searchable within the Code Directory and/or Registry and viewable without the specific outputted Codes appearing on said Directory, Registry or Pages, merely the uploaded and/or imported Images based on recognition software, metadata inputted during the Code creation and Code Page publishing processes by the respective Code-creators or combination thereof. The 'Images' may even be machine readable; meaning take End-users to the specified destinations, even without the need for the surrounding Code surrounding it as outputted and contemplated by the Device System.

Cropping and re-cropping tools for Code-creators of the uploaded and/or imported Image into the Device System can be aided by the corresponding generation of a simulated or actual, Code displaying the expected file to be outputted by the Device System to be displayed on the Code creation screen providing the Code creator a visual preview of the Code so that the Code-creator (during the Code creation processes) can be assured of the desired Code output aesthetically. The cropping aspects of the Code platform and its operating Systems also allows for embedded Images to be fixed, if desired by operators and third party service providers, meaning placed within or on a Code within the Device System's designated safe area (845) without editing or cropping in an "as is" fashion in order to achieve consistency of appearance across all Codes outputted by the Device System.

As well, the Device System allows specific cropping and also re-cropping of an uploaded or imported Image file in order for the Code-creators to utilize the Device System to output the Codes as they require. Uploaded and/or imported Images to be cropped and re-cropped can be one of but not limited to the following formats: JPEG (Joint Photographic Experts Group), .PSD (Photoshop), .AI (Adobe Illustrator), .PDF (Portable Document Format) and .PNG (Portable Networks Graphics)].

In addition, the Device System can automatically provide visual a 'preview' of a simulated or even actual Code with each 'crop' action by the Code-creator. (FIG. 24)

The Device System's design allows for Code-creators to change the size of the outputted Code file when it is resident with the Ecosystem and/or in downloaded form based on pre-set size parameters provided by the Device System's operators and third party service providers and allowed by the Device System if the file input is 72 dots per inch or greater.

In addition to modification and scalability of the size of the outputted Code, the resolution and file type regarding a downloadable version of the outputted Code to be received by the Code-creator will be able to be determined by the Code-creators and/or specified by the Device System's operators and/or third party service providers for the Device System based on the parameters inputted into the Device System by the Device System's operators and/or third party service providers for the Device System.

The size and file type options for outputted Codes, and downloadable Codes by Code-creators can also be limited by the System based on the inputted information by the Device System's operators or third party service providers for the Device System.

Color of cells and background can also be pre-determined by the operators of the Device System and in some cases selectable by the Code-creators based on a color palate and/or preprogrammed color combination choices inputted into the Device System.

Figure 13:
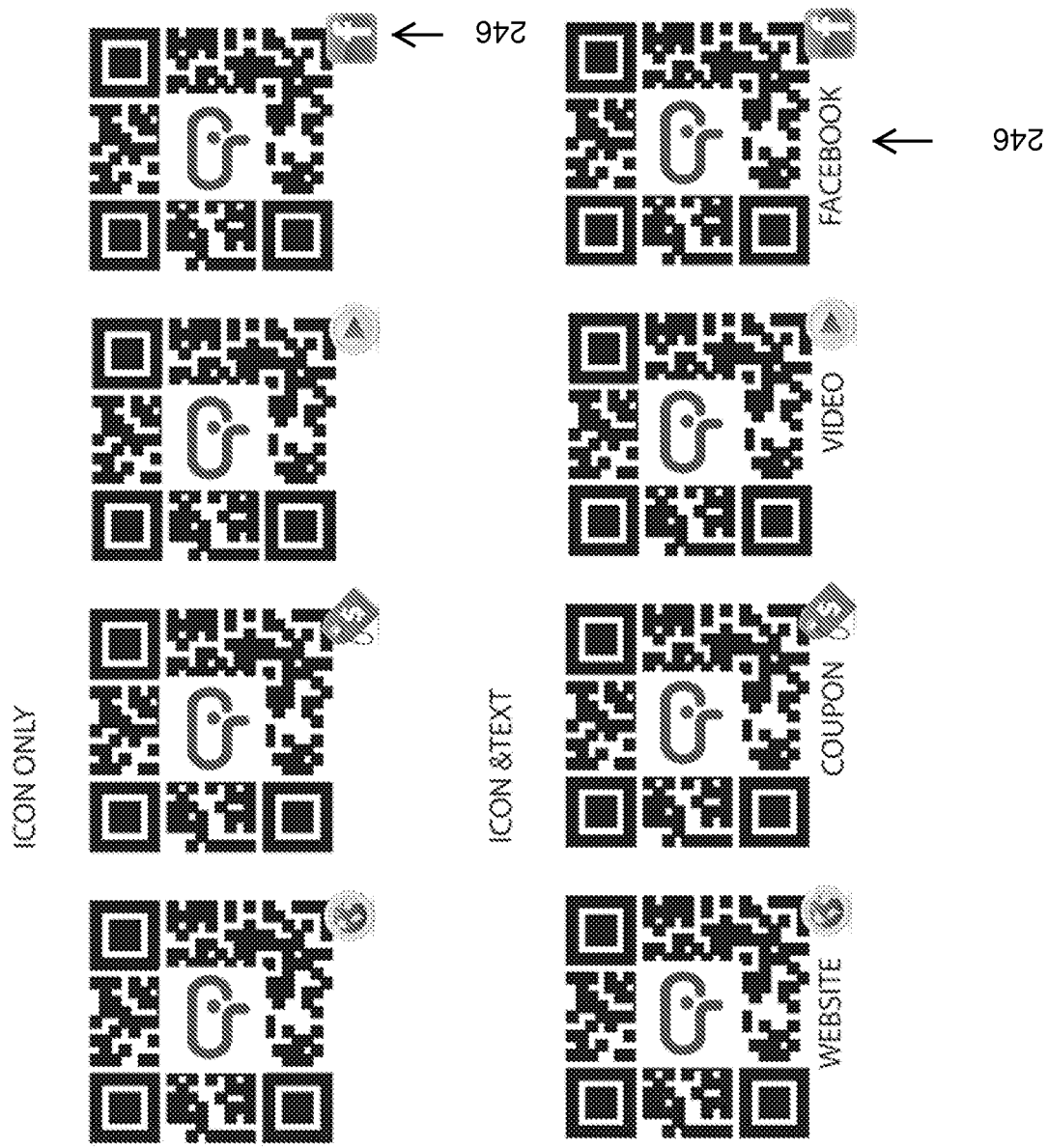
FIG. 13 illustrates QR Codes with descriptive words and/or icons.

In order to improve the End-user-experience of the Device System for the individual and End-user, the Device System can include the ability for 'Code-creators' to add selected 'icons', 'graphics' and 'words' in or around the Codes they create utilizing the Device System by selecting one or more of these to be automatically included as part of the final Code file outputted by Device System. FIG. 13 illustrates an example of such icons (246) that a Code-creator can add at the bottom of the Code and/or other border inside and/or outside the Code itself. In addition and/or in place of an icon or icons, preselected words can also be utilized and added to the Code file outputted to further enable Code-creators to visually-articulate and explain the destination of the Code (i.e. Web, Call, SMS/text, Video or Social Network) outputted by the Device System to the End-user.

These visual identifiers and 'icons' in some cases may also include 'words' which will, be able to be selected and automatically added to the final Code file outputted by the Device System at the Code-creators' option during the Code creation process or even after the initial Code created and may include information identifying the content of Codes outputted by the Device System. Such options as determined by the Device System's operators and/or third party service providers for the platform, may include but not be limited to 'words' such as 'video', 'virtual business card' or v-card', 'order now', 'coupon', 'blog', 'website', 'post video', 'post comment' or other term correlated to the destination of the Code when clicked and/or tapped one or more times and/or scanned by an End-user. Additionally, the Device System can be designed to incorporate security features for Code-creators and quality assurance automated checks and balances such as its universal record locator randomizer algorithm and associated universal record locator generator and universal record locator-shortener methodologies and system for Codes outputted by the Device System.

The Device System may also utilize third party sources to verify information inputted into the required and optional fields by the respective Code-creators that utilize the Device System.

These Verification processes may also include the automated Verification and/or manual checking of Code destinations entered and desired functionality by Code-creators (i.e. webpage address, phone number, short message service number known by abbreviation 'SMS', electronic mail address, virtual business card or contact information or other Code content and destination options offered to End-users by the Device System).

In the event or appropriate Code Verification and Authentication as determined by the Device System, the Device System may in an automated fashion add an 'identifier' to the respective Codes outputted by the Device System that have been verified and authenticated by the Device System's processes, such identifier may be visual (i.e. visible by the End-user) on the Code itself or during the End-user-experience which may be visual and/or audio based. This identifier could be an 'icon' or additional 'text' or a 'word' inside and/or outside the borders of the outputted Codes and/or unique pixel colors and/or background colors and/or shading patterns that designate the respective Code having been 'verified' or 'authenticated' by the Device System and/or third party. Such an 'identifier' as added to the outputted Code file may be visual and/or audible, meaning it could be seen and/or heard during the End-user-experience.

Code can be designated as being verified or authenticated (825 (826) in a variety of visual or even audible methodologies including but not limited to text or a symbol surrounding one or more sides of the Code. A text or symbol can also be put on the Code, such as a capital A to show Verification/Authentication. The Authentication can be inside or outside or partially inside of The Code. The Verification/Authentication can also be a color, a watermark, or signifying pixels and/or visual or audio identifier incorporated within or during any aspect of the user experience by the End-user.

The Device System also can be been designed to allow for a 'Directory' and a 'Registry' for both 'verified Codes' outputted by the System and 'non-verified Codes' outputted by the System. A 'Directory' and/or 'Registry' may be accessible only by Code-creators ('Registered Members') and/or may be accessible to both Code-creators and non-Code-creators alike. Such a cumulative database and/or partitioned sections of the Device System's database may be searchable and also feature other information as inputted by the Code-creators in addition to the Codes outputted by the System (in an opt-in format for Code-creators).

Additionally, both verified and non-verified Codes can reside in the same database and such database may also feature other information as inputted by the Code-creators in addition to the Codes outputted by the System (likely in an opt-in format for Code-creators).

The Device System can accommodate and is capable of including Codes from selected third parties to be part of its Code Directory and Registry and/or Verification and Authentication Systems.

In the event a Code that is created by the Device System that bears a specific icon, picture, logo or other 'Image' that is accessible by individual End-users and contains what the individuals deem to be misleading (based on what the Code looks like visually and its correlated destination (i.e., a specific brand for which the destination is a competitors website, for example) is determined to be inaccurate or an inappropriate destination, the Device System incorporates a 'Bad' Code 'reporting system' (229) to resolve such and as such will log complaints by users to encourage self-policing. Such a 'Bad Code Log', based on inputted data sets by the Device System's operators and/or third party service providers when to deactivate such an outputted Code automatically.

This flagging of a 'Bad Code' may be done by an individual visiting the Device System's specified 'reporting' website and/or other means such as the including of this 'Bad Code' designation into the Device System's operators and/or third party service providers for the Device System's' Code reader and/or licensed Code reader.

In an automated process, if a given Code receives a certain specified number of complaints the Device System's processes can be programmed to automatically disengage and deactivate such Code until further investigation by the respective operators of the Code-creator platform. Once a Code has been deemed a Bad Code and deactivated, the Device System can determine what visual and audible information an End-user is displayed upon scanning such a code. These Bad Codes may feature advertisements or other promotional information at the discretion of the Device System's operators and/or third party operators.

The Device System can also feature alternating user experiences with singular Code based on the number of times a Code outputted by the Device System is clicked and/or tapped one or more times and/or scanned by an End-user. In addition to being relevant in a sweepstakes or loyalty program wherein the 'X' number customer that scans a particular Code receives 'Y', a specific Branded or individual Code also ma want to have a different terminating destinations or End-user-experiences, for example the first scan of a Code outputted by the Device System may trigger a video for the user to watch while the second scan of the same Code may feature other destination or content or even downloadable information or a form or survey and the third scan a completely different user-experience and call to action.

The Device System's End-user-experience destination module can allow the Code create to direct such End-user-experiences.

This Code-destination modification module can also be utilized to have a randomized or specified number of Code scans to trigger a 'winning' event, for example, to further drive End-user continued use of a particular Code mated by the Device System.

This Code-destination 'variability' option can be configured for one Code, a series of Codes and/or even random selection of Codes outputted by the Device System based on specific data queries as set by the Code creators and or Device System operator(s) of the Code platform.

Multiple audio and or visual content and or advertisement-based experiences can be tied to the same Code.

The Device System also allows for Codes created, and outputted by the Device System to be automatically deactivated by the System or Code-creators based on a certain time period after a Code has been created or duration of renewal (i.e. one year from date of creation or one year from date of last modification) and/or certain, number of scans (meaning the Codes outputted by the Device System can be Deactivated after 100 scans by an End-user, for example), as well the Device System can determine the destination location of all such Deactivation and/or expired Codes, as well as subsequently affixing advertising messages to such Codes when and if they are clicked and/or tapped one or more times and/or scanned by an End-user after the said Deactivation. Such 'Deactivated Codes' may have the same or different advertisements or promotional messages associated with them when clicked and/or tapped one or more times and/or scanned by an End-user as the previously referenced Bad codes which have also been 'deactivated' by the Device System.

This process implemented by the Device System during an outputted Code's interactions with an End-user (one that scans the Code) can also allow for a fraction of a second to thirty seconds or more of a commercial advertisement to be uniformed across all outputted Codes and/or from a specific geographic area an or other metric and/or randomized upon a Code that is 'active' 'deactivated' being clicked and/or tapped one or more times and/or scanned by an End-user while it is in the process 'loading' the destination or prior to revealing the destination of the Code outputted by the Device System.

The 'commercial' or 'advertisement' as housed and served by the Device System will be able to be static text and/or page(s) and/or simple animation and/or a single and/or multiple frames that can be displayed on an internet-connected device and triggered by scanning, tapping or clicking on Codes outputted by the Device System as configured by the Device System's operators.

The commercial/advertisement delivered by the Device System can have a duration of a fraction of a second to thirty seconds or more if desired by the Device System's operators of the Device System, but five (5) seconds is utilized solely for descriptive purposes herein. Notably 'load times' for mobile-web pages can average twelve seconds in some cases so the system allows for the duration of an advertisement to be varied on a Code by Code basis, if configured by the Device System's operators, and such configuration may be based on connection-speeds and other variables and metrics the Device System culls from End-users' internet-connected devices and mobile operating systems. To this end, the Device System can reside on the same server as an advertising partner, reseller or digital publisher to expedite page load times.

The commercial is 'aired' and visible and even heard audibly by the End-users that have clicked and/or tapped one or more times and/or scanned the Device System's outputted Codes and as such, these advertisements are presented and displayed to the End-user while the Code is reaching its destination or has reached its destination.

Due to the processes of the Device System, the insertion of these advertisements are able to be constant in terms of frequency of appearance to an End-user (meaning appear every time a Code outputted by the System is clicked and/or tapped one or more times and/or scanned by an End-user) and/or also able to be randomized or even alternated (meaning one scan of a particular Code created and outputted by the Device System may have an advertisement associated with it whereas as the next scan of the same Code may not).

Additionally the Device System allows for the same advertisement to appear across all Codes or groups (that may be geographically-based or some other metric) of Codes outputted by the Device System at specified times for a specified duration (one day, one week) or frequency (total number of advertisements served through Codes, for example, one million impressions).

Further, advertisements tied to the outputted Codes can be further categorized to include, 'topics' associated with or correlated to specific metadata associated with outputted Codes (for example, Brands, only or Individuals only or, females only).

Inputted geographic data by the Code-creators at the time of Code creation can also be cross-referenced by the Device System and correlated to the System's advertising and commercial serving module.

The Device System also allows for additional profiling filters to allow for the best match or most relevant match between prospective advertisers and the Device. System's outputted Codes and even Code-creators that can be based on specified inputted data by advertisers cross-referenced with Code creation data by the Device System.

An advertisement-insertion rotation System can be integrated in the outputted Code management System that can allow different advertisements to appear in sequence, specified intervals or at random intervals.

The tracking System associated with the prospective advertiser and outputted Code matching processes also can enable preconfigured offerings to Code-creators that can allow them to pay a reduced rate for Code creation and/or download of such and/or even associated monthly and/or annual and/or per scan fees in the event they select and accept advertisements to appear in the Codes they create as outputted by the Device System.

In the event Code-creators do not wish to have advertisements appearing within the Codes they have created with the Device System when said Codes are clicked and/or tapped one or more times and/or scanned by End-users, this option will also be allowed but may result in different fees being assessed to the Code creators by the operators of and/or third party service providers for the Device System.

A user-generated advertising module for the Codes created and outputted by the Device System may be viewable by individuals through stand-alone Codes and/or even within a 'Code Registry' (832) also known as a 'Code Directors' as such, these advertisements are also byproducts of the Device System and comprise another aspect of the correlated Ecosystem along with the Code Pages module and direct to print production processes and module that integrates the printing of printed products and other merchandise and integration in template digital products and advertising formats. Uploading up of '30 (thirty) second commercials' or even commercials that are a 'fraction of a second' (or other specified duration by the operators of the Device System) by registered Code-creators may include pictures, simple animation and/or video and such user-generated content may be categorized by Brand Tag or Subject within the Device System and advertising serving platform's database. Code-creators looking to 'populate' their Codes with these user-generated advertisements may receive a discount on Device System services. The Device System's operators and/or third party service providers for the Device System may also access this pool of user-generated advertisement inventory and select theme and/or brands or other messages to appear to End-users. Additionally, the Device System will allow for certain registered Code-creators (Brands and/or individuals) to select from this pool of user-generated commercials and corresponding database and other user-generated content such as short 'testimonials' (by the Brand or a Brand's users) advertisements such a 'thematic' compositions (i.e. Birthday parties or the Beach) that are uploaded to the platform by other Code-creators and advertisers to be added to the registered Code-creators' Codes at the discretion of the Code-creator. The system allows for the 'screening' of such user-generated content to 'approve' content prior to making it available to be added to the End-user experience tor Codes outputted by the system.

This ready-made advertising platform can also calculate fees and royalties to be potentially payable to the creators of the user-generated content and commercials as well as any associated billing of Registered Members for use of such.

These commercials can be inserted by the platform and 'aired'/shown to the individual End-user by the Device System when the Code outputted by the device/system is clicked and/or tapped one or more times and/or scanned or read by a third party Code reader and/or by a Device that the Device System operators create and/or license.

Alternatively and/or in addition these commercials that may be resident within the End-user-experience interface associated with the Device System for Codes outputted, the device/system also allows for manual enabling and viewing of such content and, commercials by End-users such that they are not be automatically served but viewed by an End-user at an End-user's convenience with a tap or the click a an on-screen button on their internet-connected device.

In addition, such commercials that are inherent in the Device System's operator's Code creation platform and coupled with Device System's operator's Code Ecosystem and operating Systems may also feature 'interactivity' that will allow an individual End-user that has viewed or is viewing the commercial spot to, among other proposed functionality, vote in favor or disfavor of said 'commercial' and/or also type and/or post a comment for the respective commercial spot and/or 'share' such commercial spot by means of 'forwarding' such commercial spot through a social network interface or other means by means of a mobile browser and/or mobile operating system built into the Device System's operator's and/or third party service provider's advertising serving module and platform that is tied to each Code outputted by the Device System.

There can also be deep direct integration (818) (819) of the functionality associated with the outputted Codes regarding internet-connected wireless devices and tablets, mobile handsets, mobile operating systems, downloadable applications and code readers as well as mobile browsers, mobile operating systems and traditional desktop browsers and desktop operating systems. Further, deep direct integration with third party mobile operating systems and applications can further expand the functionality spectrum of the Device System and its corresponding Ecosystem. An example of this deep direct integration can include information inputted by a Code-creator in the Code enation process allowing the resulting outputted Code by the Device System and associated inputted information and data by the Code creator when clicked and/or tapped one or more times and/or scanned by an End-user to be added to the address book (821) or calendar of the smartphone or device utilized by the End-user (823) or such functionality may even include items may be added and/or auto-populated into an electronic-commerce-based shopping cart that may be resident on the End-user's internet-connected device, smartphone, mobile tablet or e-reader that scans the respective Code. The retrieved data can be automatically added (818) based on an End-user's pre-determined settings or manually (819) added by the End-user.

Additional deep direct integration with third, party mobile tablet and handset makers and/or mobile operating systems and/or mobile browsers and/or downloadable and/or remotely accessed applications can include items such as calendar entries, pre-populated order forms and items, loyalty points accumulation and/or tracking and/or digital wallet capabilities such as balance inquiry and payment options upon a Code outputted by the Device System being clicked and/or tapped one or more times and/or scanned by an End-user with an internet-connected device.

Deep direct integration of the Device System's outputted Codes may also correlate specifically Codes to a proprietary payment system which will reconcile payments, transfers between Code-creators and even End-users and allow for automated ordering of products and services from within an even outside the Device System's Ecosystem through processes that bind such payment systems to the Codes outputted by the Device System.

The Device System's Code Pages functionality may also feature a 'grouping' feature allowing sharing only with specific other registered Code-creators that they have pre-approved.

The System can allow for brands and individuals to upload their own commercials to their respective Code's metadata or to be submitted for consideration on other Codes that have been outputted by the System and may integrate a tracking and loyalty-based System enabling Code-creators and users, either collectively or partitioned individually, to earn points and rewards regarding their interactivity with the Codes.

There can be 'Reselling' of the Device System's Codes through a methodology inherent in the Code creation Ecosystem, operating System and platform modules. The Device System also allows for the integration of a Reseller program wherein the Device System will be able to be added to third party websites either in an automated fashion or manual fashion in order for said website(s) to also output Codes utilizing the System's methods of the Device System and avail such Resellers to each Code's corresponding Code Rage module at the discretion of the Device System's operators and/or third party operators of the Device System. These Resellers and the resulting Codes create by each may also comprise part of the referenced Directory and/or Registry.

This 'code-creation-as-a-service' module Can allow the Device System Code output capabilities to not solely reside within the Device System's operator's initial. System but enable many third party service providers and or websites and services providers (known collectively as 'Resellers') around the world to connect to and/or access the System through a cloud-based interface and/or through an installed server environment that may reside within such third party service providers data infrastructure. The output of Codes and associated downloads of Codes by the Device System and/or production of printed products and other merchandise featuring the outputted Codes may also be achieved by said third parties that have access to some or all of the Device System modules and its corresponding Ecosystem and printing and merchandise production interface and/or may be achieved through a third party's own direct-to-print interface as integrated by the Device System's operators and/or third party service providers and/or other production, printing and merchandising modules thereof for Codes outputted by the Device System.

This Reseller integration can also calculate in the aggregate the number of outputted Codes that have been created, generated and outputted by the Device System in the aggregate: or on a service provider ('Reseller') by service provider, ('Reseller') basis and also track usage of such outputted Codes as well as associated payment streams, royalties, and analytics 'associated with all Codes related to the Device System modules' and Ecosystem at the Device System's operator's discretion which could be calculated on a Reseller basis or geographic parameter such as by Country of creation.

Device 1 is able to output the 2D Code, C21, with graphics, which satisfies error rate criteria, after obtaining the character string information, I21 and the embedding data, G21. The 2D Code, C21, with graphics, is a 2D Code containing the character string information that human eyes can infer without decoding the 2D Code.

Provided is a machine-generated, customizable and configurable, image insertion system (processor and internet-based processes) where the location orientation for the image insertion on the code can be pre-fixed in order to automate image uploads (and through importing images from third party sites) of a specific pre-fixed size (i.e. image to code ratio) in order to maximize readability."

The 2D Code can be generated directly from the obtained character string information, or it can be generated by first reducing the obtained character siring information. FIG. 26 provides an example where a character string information is shortened. The reducing of the character string information can be done while still maintaining the same information as the pre-existing 2D Code, e.g., In case of an URL being encoded, a person scanning the code would be directed to the same website despite encoding for a shortened URL that is different from the original URL.

The image can be embedded on the 2D Code so that the image covers part of the 2D Code. The 2D Code, however, can still be decoded despite the image being placed on the 2D Code. In this embodiment, the length of character string information to be encoded for the 2D Code needs not necessarily be reduced.

No matter whether the character string information for the code is reduced or not, the device takes into account a combination of factors particularly the number of characters for the code, size of the image and orientation of the image to reduce error correction and increase-readability of the 2D Code. FIG. 27 illustrates the device taking into account character string information in allowing where an image can be placed on the 2D Code. Based on the number of the character string information, some areas are blocked for placing an image. A person can then select of the available areas, which location on the code provides the best option for placing the image. The system creates a "fenced in area" wherein an image can be dropped anywhere within in addition to the size of the image itself being configured to be as big as the "fenced in area" or as small as desired and then dropped anywhere within the "fenced in area". This "fenced in area" can also be reduced and/or oriented/aligned by the system in a pre-determined manner which would provide users less latitude/options regarding the image placement position. Additionally, the system can pre-determine the requisite size of the image as well, effectively arriving at the pre-determined location and pre-determined size. Thus, the system has maximum range and flexibility with regard to the "automated-design of 2D Codes" due to its customizability as well as pre-configurability by an administrator or end-user or consumer. The "fenced in area" represents the maximum area available to increase readability with a superior scanner such as a smartphone camera with 3 to 6 Megapixels. The 1/9 ratio coupled with a center-alignment is the maximum size for readability for feature phones and smartphone cameras that may be of less quality (like 1.2 to 2. Megapixels versus 3 to 6 Megapixels).

The device can encompass a self-service 2D Code tool/application/software, preferably QR, where the automated and machine generated nature of the 2D Codes embedded with images allows a person to automatically embed a desired image. The machine-driven application software allows self-service creation of 2D Codes that feature embedded images.

The device can comprise a memory for storing a program to be executed by a processor and an interface that facilitates viewing a 2D Code with an embedded image. Instead of a memory, the device can Obtain character string information or even graphic data through the Internet or other networks. The image can be any visual sign that is different than the 2D and allows person who views the image to appreciate that any visual sign has been embedded. The image can include at least one of a letter or number or combination, multiple letters or initials or numbers or combinations, a word, a keyboard symbol (%, $, @), an icon, an emblem, a shape, a design, a logo, a trademark, a face, an avatar, a picture, a brand, a number, a plurality of numbers, and combinations thereof. The character string information can include one or more of the following characters: numeric digits, alphabetic characters, symbols (SP, $, %, *, +, -, ., /, :), 8-bit Latin/Kana characters and Kanji characters.

The ratio of space covered by the embedded image compared to the code is preferably about 1/3 to about 1/12, more preferably about 1/9. The code with the embedded image can have about 0 to about 100 characters, or about 0 to about 50 characters. The 2D Code can be preferably a QR Code.

The graphic data can be input in a format selected from the group consisting of jpg, bmp, gif, png, psd, eps, and ai. If an original image is a vector image, the device can change the file format into a raster image or bmp format. The image embedded in the 2D Code (i.e., graphic data output with 2D Code) can be output in a format selected from the group consisting of eps, png, ai, gif, bmp, pdf, psd, jpg, and tiff. The device can give the consumer/customer a choice or output as a bmp file. More than 120 pixels on a side are recommended in use on the Internet, in terms of code output and the following formats: jpg, png, or gif are recommended. In print media, the following format outputs of the codes are recommended: eps, psd, ai, bmp, or jpg. The preferable minimum output for the codes is 600 dpi and 1.182 inch (3 cm).

Figure 25:
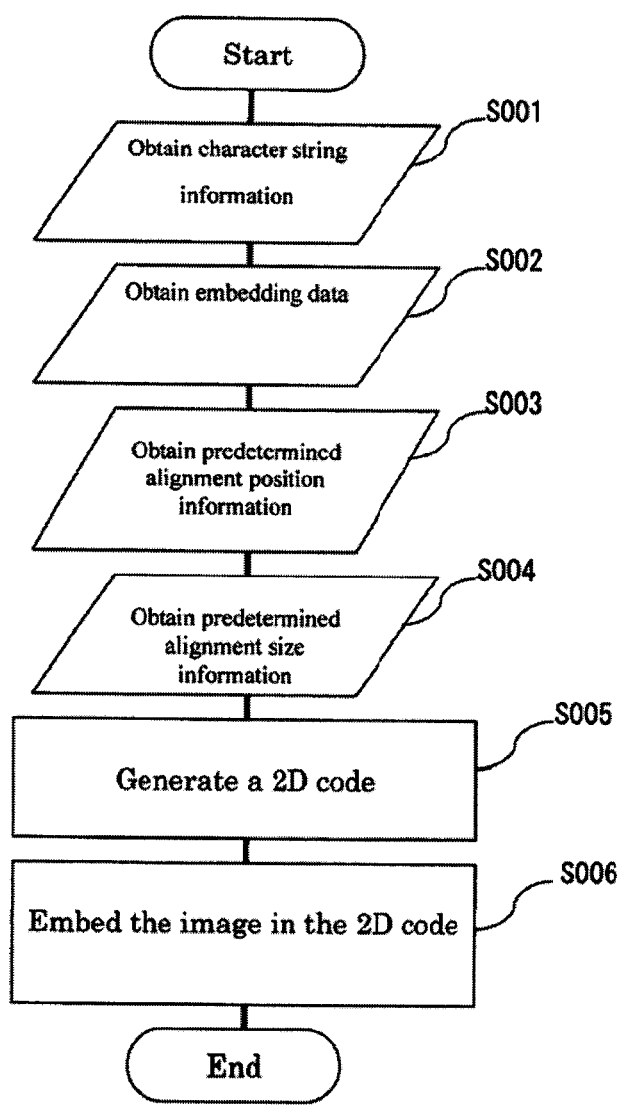
FIG. 25 illustrates embedding images of predetermined alignment position and size.

In another embodiment, an image of a predetermined size and alignment is embedded at a predetermined location in the 2D Code, wherein the image is of a size and alignment that allows for the code to be decoded properly. This predetermination of size and alignment allows for mass producing the codes with the embedded images without readjusting the image each time an image is embedded. The images that are mass produced can be same or different, and still have the same site and optionally alignment. For example, unrelated images A, B, and C can be made of the site and alignment, for example 1/9 and upright, respectively. A customer can give an order for particular 2D Codes with different images. The codes would be generated so that the image A, B, and C are embedded automatically in the codes without the need to individually for each embedding to cheek size, alignment, or location of the images. The method can also be done with the same image where a customer orders a plurality of for example image A. This embedding of an image with a predetermined size, alignment, and/or location is illustrated in FIG. 25. The codes that are mass produced can be the same or different. The device can generate both a plurality of same codes and plurality of different codes, with the same or different images having the same size and alignment. The images can be produced with the same maximum size possible without substantially diminishing the accuracy of decoding the 2D Codes. For example, all the images would be made so to be 1/9 size, with the code covering the rest of 8/9.

The device in addition to embedding an image, it can configure the cell colors and background colors to compliment the image or just to make the code any color picked by a person or company that seeks to generate this code by using the automated machine generated process. This personalization of formerly mundane, generic, black and white 2D Codes with colors give the codes life or vibrancy in addition to further complimenting the embedded image.

When the code size is used below 160×160 pixel or 1.5×1.3 cm, some code scanning problems could occur with some scanning readers (apps/scanners). The scanning problems could happen to standard 2D Codes as well as QR Codes with embedding images. Generated code can be resizable to any size as a consumer likes. It is best to refrain from reducing the code size to 160×160 pixels or 1.5×1.5 cm or less. When resizing a code, it is best not to produce the following phenomena: One of cells would appear as a rectangle shape, though the cells are normally square-shaped; the code image is rough around the edges. Anti-aliasing functionality may be activated on the image editing software such as Adobe Photoshop, so that the code image may become a blurred image.

In the print media, the following may be considered: Improving the printing quality (in order not to produce too dark/light/pale color, or discolored, and the change in shade in the process of printing). Regarding the method of printing, the offset printing or gravure printing would be preferable for the 2D Codes. In case of other printing methods, test printings in advance is recommended. Regarding the printing paper, more than 85% whiteness on the whiteness measurement is recommended. Avoiding poor-quality papers such as the coarse or ground-wood paper is recommended. For using the code in planar media (flat surface), it is recommended to refrain from using distorted or curved media, as well as the use of reflective materials (mirrors, silver item and etc.) as well as the uneven (non-flat) surface. When the code is normally printed, a cell (dot) size can have at least 0.35 mm or more to detect each cell with scanning readers (scanners). It is best to retain margin (quiet zone around the code) that is equivalent to a four-cell space or more. It is better to have more margins (over 8-cell space would be preferable), if printing papers (media) are not the white color; the code background or surrounding is covered with some dark colors (e.g. black); or the code color is changed.

For digital media, display (shown) the code in the center of the screens as large as possible, if you use the code on the screens such as personal computer, public TV, or digital signage. The light emanated from the screen surface may cause the code scanning to become difficult. Also, if the code is the small size, the camera mobile phone has to move closer to the screen surface (code). It means that the light-emitting from the screen directs against the mobile camera, so that the reader (scanner) may receive, the direct light. That would raise the possibility of code scanning troubles. Consider the screen aspect ratio, if the code is used for several kinds of screens. The aspect ratio may differ: according to each screen. It is recommended that the encoded information should be showed near the code. Alternatively, more than two codes should be prepared for such a problem. If the code is inserted into the video or movie, it is better to take the preparation time for users to scan the code into account. It is better that the code, should be displayed for a long time.

EXPLANATION OF THE CODES

1. Device
2. Memory Device or Auxiliary storage device
3. Program
4. CPU
5. Memory
6. Input Device
7. Output Device
8. Communication network

What is claimed is:

1. A system for producing a 2D (2-Dimensional) code with an embedded image for an automated machine generated process, comprising a processor that produces the 2D code with an embedded image by:
   i) obtaining information to be encoded for a 2D code and an image to be embedded in the 2D code;
   ii) optionally reducing the obtained information;
   iii) generating the 2D code having cells by encoding the information;
   iv) processing the image to obtain the image with pixels of a same size as each cell of the 2D code; and
   v) embedding the image of a predetermined size and optionally aligning at a predetermined location on the 2D code, wherein the image is of a size and alignment that allows for the code to be decoded properly;
   wherein the 2D Code is a QR (Quick Response) code.

2. A system as described in claim 1, wherein the system generates a plurality of same or different 2D codes with same or different images, wherein all the images embedded in the 2D codes have a same size and alignment.

3. A system as described in claim 1, wherein the system generates both a plurality of same codes and plurality of different codes.

4. A system as described in claim 1, wherein the system generates the 2D codes with different information.

5. A system as described in claim 1, wherein the system generates a same image on a plurality of codes that have different information.

6. A system as described in claim 1, wherein the system generates a same image on a plurality of identical 2D codes.

7. A system as described in claim 1, wherein the image is embedded with a same maximum size possible without substantially diminishing the accuracy of decoding the 2D codes.

8. A system as described in claim 1, wherein a ratio of space covered by the image compared to a code surface is about 1/3 to about 1/12.

9. A system as described in claim 1, wherein a ratio of space covered by the image compared to a code surface is about 1/9.

10. A system as described in claim 1, wherein an error calculation to determine that the image is placed in a correct position is not necessary due to the code and image having predetermined locations.

11. A system as described in claim 1, wherein the image to be embedded on the code is selected from the group consisting at least one of a letter, multiple letters or initials, a word, a keyboard symbol, an icon, an emblem, a shape, a design, a logo, a trademark, a face, an avatar, a picture, a brand, a number, a plurality of numbers, and combinations thereof.

12. A system as described in claim 1, wherein the code generated by the system has a character string information comprised of letters, numbers, symbols or combination thereof.

13. A system as described in claim 1, further comprising a memory for storing a program to be executed by a processor, and an interface that facilitates viewing a 2D code with an embedded image.

14. A system as described in claim 1, wherein the code generated by the system contains machine-readable characters consisting of the group selected from one or more of text, letters, numbers, symbols and combination thereof.

* * * * *